(12) United States Patent
Kim

(10) Patent No.: US 10,469,137 B2
(45) Date of Patent: *Nov. 5, 2019

(54) METHOD AND APPARATUS FOR TRANSMITTING AND RECEIVING SIGNALS IN MULTI-ANTENNA COMMUNICATION SYSTEM

(71) Applicant: Samsung Electronics Co., Ltd., Suwon-si, Gyeonggi-do (KR)

(72) Inventor: Yung Soo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 149 days.

This patent is subject to a terminal disclaimer.

(21) Appl. No.: 15/435,843

(22) Filed: Feb. 17, 2017

(65) Prior Publication Data

US 2017/0163317 A1 Jun. 8, 2017

Related U.S. Application Data

(63) Continuation of application No. 13/677,660, filed on Nov. 15, 2012, now Pat. No. 9,614,594.

(30) Foreign Application Priority Data

Nov. 16, 2011 (KR) .......................... 10-2011-0119445

(51) Int. Cl.
*H04B 7/0408* (2017.01)
*H04B 7/0456* (2017.01)
(Continued)

(52) U.S. Cl.
CPC ......... *H04B 7/0408* (2013.01); *H04B 7/0456* (2013.01); *H04B 7/0617* (2013.01);
(Continued)

(58) Field of Classification Search
CPC .... H04B 1/7107; H04B 7/024; H04B 7/0452; H04B 7/0617; H04B 7/088; H04B 7/0408;
(Continued)

(56) References Cited

U.S. PATENT DOCUMENTS 4,849,763 A 7/1989 Dufort
5,115,243 A 5/1992 Perry et al.
(Continued)

FOREIGN PATENT DOCUMENTS

| CN | 101459459 A | 6/2009 |
|---|---|---|
| EP | 0 854 590 A2 | 7/1998 |
| EP | 1 118 875 A2 | 7/2001 |

OTHER PUBLICATIONS

Iordanis Koutsopoulos et al., CSHCN TR 2002-30, Technical Research Report, "Adaptive Channel Allocation for OFDM-Based Smart Antenna Systems with Limited Transceiver Resources," 2002, University of MD, MD.

*Primary Examiner* — Harun Chowdhury
(74) *Attorney, Agent, or Firm* — Jefferson IP Law, LLP

(57) ABSTRACT

A method for transmitting a signal in a multi-antenna system is provided. The method includes designating an analog beam to a plurality of generated modulation symbol sequences corresponding to a plurality of antenna ports, for each antenna port of the plurality, multiplexing signals, to which a beam is designated by the beam assignment, to a plurality of beam groups each having the same antenna beam combination, mapping beam group signals generated by the beam multiplexing, to at least one Orthogonal Frequency Division Multiplexing (OFDM) symbol and time and frequency resources, generating OFDM symbol signals corresponding to one or more antenna beams by OFDM-converting the beam group signals according to the resource mapping, converting the OFDM symbol signals into analog
(Continued)

Radio Frequency (RF) signals, and transmitting the analog RF signals via a plurality of antenna elements by carrying the analog RF signals on associated antenna beams by analog beamforming.

20 Claims, 17 Drawing Sheets

(51) Int. Cl.
*H04L 5/00* (2006.01)
*H04B 7/06* (2006.01)
*H04W 72/10* (2009.01)
*H04B 7/0417* (2017.01)

(52) U.S. Cl.
CPC ......... *H04B 7/0691* (2013.01); *H04L 5/0023* (2013.01); *H04L 5/0042* (2013.01); *H04W 72/10* (2013.01); *H04B 7/0417* (2013.01)

(58) Field of Classification Search
CPC .. H04B 7/0456; H04B 7/0639; H04B 7/0691; H04W 24/02; H04W 72/00; H04W 72/10
USPC ....... 370/203, 329, 334, 338, 252, 330, 436; 455/450; 375/295, 219
See application file for complete search history.

(56) References Cited

U.S. PATENT DOCUMENTS

| | | | |
|---|---|---|---|
| 5,675,554 A | 10/1997 | Cole et al. | |
| 5,956,620 A | 9/1999 | Lazaris-Brunner et al. | |
| 6,167,286 A | 12/2000 | Ward et al. | |
| 6,364,836 B1 | 4/2002 | Fukukita et al. | |
| 6,496,158 B1 | 12/2002 | Ksienski et al. | |
| 6,968,022 B1 | 11/2005 | Poor et al. | |
| 7,088,671 B1* | 8/2006 | Monsen | H04B 1/7107 370/203 |
| 7,116,650 B2 | 10/2006 | Takeuchi et al. | |
| 7,610,036 B2 | 10/2009 | Teo et al. | |
| 8,018,984 B2 | 9/2011 | Lee et al. | |
| 8,396,035 B2* | 3/2013 | van Rensburg | H04B 7/024 370/330 |
| 8,654,815 B1 | 2/2014 | Forenza et al. | |
| 2002/0177468 A1 | 11/2002 | Takeuchi et al. | |
| 2007/0086400 A1 | 4/2007 | Shida et al. | |
| 2008/0112504 A1 | 5/2008 | Jiang et al. | |
| 2008/0204319 A1 | 8/2008 | Niu et al. | |
| 2009/0040107 A1 | 2/2009 | Yun et al. | |
| 2009/0041150 A1 | 2/2009 | Tsai et al. | |
| 2009/0201839 A1 | 8/2009 | Smee et al. | |
| 2009/0252250 A1 | 10/2009 | Heath, Jr. et al. | |
| 2009/0280866 A1 | 11/2009 | Lo et al. | |
| 2009/0318157 A1* | 12/2009 | Hoshino | H04B 7/0452 455/450 |
| 2010/0165952 A1 | 7/2010 | Sung et al. | |
| 2010/0246712 A1* | 9/2010 | Suo | H04B 7/0617 375/295 |
| 2010/0273498 A1* | 10/2010 | Kim, II | H04W 24/02 455/450 |
| 2011/0305263 A1* | 12/2011 | Jöngren | H04B 7/0617 375/219 |
| 2013/0215868 A1 | 8/2013 | Chun et al. | |
| 2014/0035783 A1 | 2/2014 | Contarino et al. | |

* cited by examiner

ABSTRACT

METHOD AND APPARATUS FOR TRANSMITTING AND RECEIVING SIGNALS IN MULTI-ANTENNA COMMUNICATION SYSTEM

CROSS-REFERENCE TO RELATED APPLICATION(S)

This application is a continuation application of prior application Ser. No. 13/677,660, filed on Nov. 15, 2012, which claimed the benefit under 35 U.S.C. § 119(a) of a Korean patent application filed on Nov. 16, 2011 in the Korean Intellectual Property Office and assigned Serial No. 10-2011-0119445, the entire disclosure of which is hereby incorporated by reference.

BACKGROUND OF THE INVENTION

1. Field of the Invention

The present invention relates to transmission/reception of signals in a communication system. More particularly, the present invention relates to a signal processing and transmission/reception method and apparatus for supporting analog beamforming in a digital multi-antenna system.

2. Description of the Related Art

An enhanced wireless communication system, such as a 3rd Generation Partnership Project Long-Term Evolution (3GPP LTE) system, employs digital signal processing architecture that transmits and receives signals using a plurality of antennas. In order to support a variety of use environments and conditions during the use of multiple antennas, such a wireless communication system designates or assigns transmission signals to virtual antennas called antenna ports by digital processing. The transmission signals are mapped to actual transmit antennas, and transmitted via a Radio Frequency (RF) unit and an antenna unit after being converted into analog signals. Commonly, a signal transferred to each antenna is completely processed in the digital domain, and the processing in the digital domain may flexibly apply a variety of multi-antenna algorithms that support a plurality of codewords and a plurality of layers. However, the conventional wireless communication system may not employ more antennas, since it employs only the digital signal processing method to use multiple antennas. Because the number of available antennas is limited, the available antenna gain is also limited.

Analog beamforming technology used in a communication system that supports relatively static stations, as in the Institute of Electrical and Electronics Engineers (IEEE) 802.11ad standard, may support a very large number of antennas and control beams using phase shift values or switches in an analog unit. The analog beamforming technology shifts a phase of one analog signal by means of an RF unit, and transmits the phase-shifted signals via $N_T$ antennas. This analog beamforming (or RF beamforming) may significantly increase the antenna gain with the use of a very large number of antennas, but its performance may be limited because its digital unit may not employ various digital antenna signal processing technologies, including digital beamforming. In addition, the analog beamforming technology supports only Time Division Multiplexing (TDM), but does not support Frequency Division Multiplexing (FDM).

This conventional technology either employs multi-antenna technology by digital signal processing, or performs analog beamforming by controlling an analog unit. Therefore, it is unable to obtain the benefits of the two different technologies. Therefore, a new technology is needed to efficiently support both the multi-antenna technology by digital signal processing and the analog beamforming.

SUMMARY OF THE INVENTION

Aspects of the present invention are to address at least the above-mentioned problems and/or disadvantages and to provide at least the advantages described below. Accordingly, an aspect of the present invention is to provide a signal processing method and apparatus for efficiently supporting both multi-antenna technology by digital signal processing and analog beamforming.

Another aspect of the present invention is to provide a signal processing method and apparatus for flexibly coping with a variety of user and channel environments using a variety of digital multi-antenna signal processing technologies and multiple access technologies, while obtaining a very high antenna gain by performing analog beamforming with the use of a large number of antennas.

Another aspect of the present invention is to provide a method and apparatus for supporting both digital multi-antenna technology and analog beamforming by means of integrated signal processing architecture.

Another aspect of the present invention is to provide a method and apparatus for transmitting and receiving user data and control signals to support both digital multi-antenna technology and analog beamforming.

In accordance with an aspect of the present invention, a method for transmitting a signal in a multi-antenna system is provided. The method includes a beam assignment process of designating an analog beam for each antenna port of a plurality of antenna ports to a plurality of modulation symbol sequences generated to correspond to the plurality of antenna ports, a beam multiplexing process of multiplexing signals, to which a beam is designated by the beam assignment process, to a plurality of beam groups each having the same antenna beam combination, a resource mapping process of mapping beam group signals generated by the beam multiplexing process, to at least one Orthogonal Frequency Division Multiplexing (OFDM) symbol and at least one time-frequency resource, an OFDM generation process of generating OFDM symbol signals corresponding to one or more antenna beams by OFDM-converting the beam group signals according to the resource mapping, a conversion process of converting the OFDM symbol signals into analog Radio Frequency (RF) signals, and a transmission process of transmitting the analog RF signals via a plurality of antenna elements by carrying the analog RF signals on associated antenna beams via analog beamforming.

In accordance with another aspect of the present invention, an apparatus for transmitting a signal in a multi-antenna system is provided. The apparatus includes a beam assignment unit for designating an analog beam for each antenna port of a plurality of antenna ports to a plurality of modulation symbol sequences generated to correspond to the plurality of antenna ports, a beam multiplexer for multiplexing signals, to which a beam is designated by the beam assignment unit, to a plurality of beam groups each having the same antenna beam combination, a resource mapper for mapping beam group signals generated by the beam multiplexing, to at least one OFDM symbol and at least one time-frequency resource, an OFDM generation unit for generating OFDM symbol signals corresponding to one or more antenna beams by OFDM-converting the beam group signals according to the resource mapping, a conversion unit for converting the OFDM symbol signals into analog RF signals, and an analog beamforming unit for transmitting the analog RF signals via a plurality of antenna elements by carrying the analog RF signals on associated antenna beams via analog beamforming.

In accordance with another aspect of the present invention, an apparatus for receiving a signal in a multi-antenna system is provided. The apparatus includes a plurality of antenna elements for receiving signals from one or more receivers, low-noise-amplifiers for low-noise-amplifying the received signals, a switching unit for selecting a signal corresponding to at least one reception beam selected by digital processing from among the amplified signals, for each individual antenna element, a phase shifting unit for outputting a plurality of reception beam signals by applying phase shift values determined by a digital processing unit, to the selected signal, and a conversion unit for converting the reception beam signals into digital beam signals, and transferring the digital beam signals to the digital processing unit.

In accordance with another aspect of the present invention, an apparatus for receiving a signal in a multi-antenna system is provided. The apparatus includes a plurality of antenna elements for receiving signals from one or more receivers, low-noise-amplifiers for low-noise-amplifying the received signals, a phase shifting unit for outputting a plurality of reception beam signals by applying phase shift values determined by a digital processing unit, to the amplified signals, and a conversion unit for converting the reception beam signals into digital beam signals, and transferring the digital beam signals to the digital processing unit.

In accordance with another aspect of the present invention, an apparatus for receiving a signal in a multi-antenna system is provided. The apparatus includes a plurality of directional antenna elements arranged in different directions, for receiving signals from one or more receivers, low-noise-amplifiers for low-noise-amplifying the received signals, a switching unit for selecting at least one of the amplified signals as a reception beam, for each individual antenna element, and a conversion unit for converting the selected signal into digital beam signals and transferring the digital beam signals to the digital processing unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New technology for efficiently supporting both multi-antenna technology by digital signal processing and analog beamforming (or Radio Frequency (RF) beamforming) in a communication system will be described below.

Figure 1A:
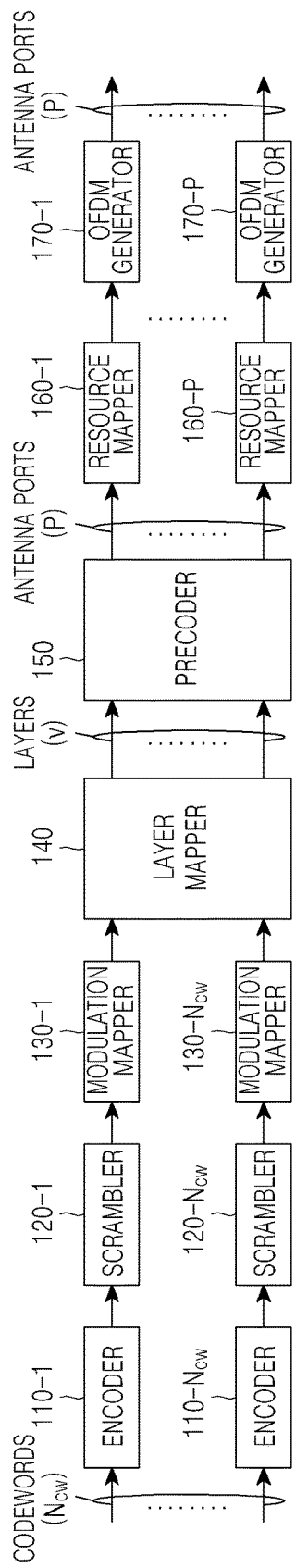
FIGS. 1A and 1B schematically show a transmission structure of a multi-antenna system by digital signal processing according to an exemplary embodiment of the present invention.
Figure 1B:
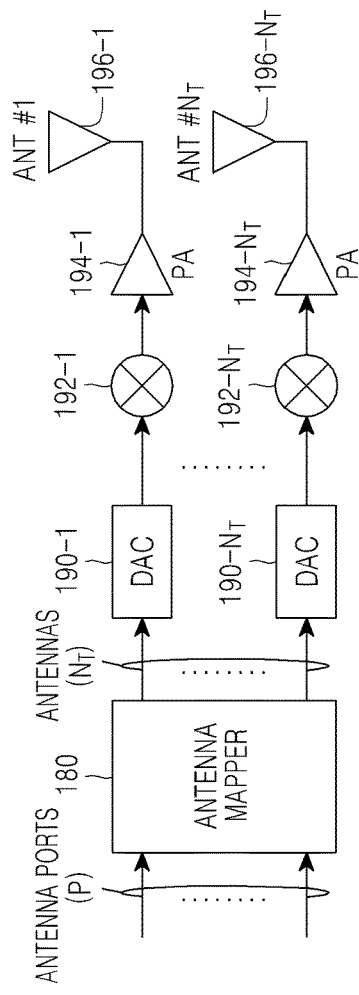

FIGS. 1A and 1B schematically show a transmission structure of a multi-antenna system by digital signal processing according to an exemplary embodiment of the present invention.

Referring to FIG. 1A, $N_{cw}$ codewords are input to and encoded by $N_{cw}$ encoders 110-1~110-$N_{cw}$, respectively. Output bits of the encoders 110-1~110-$N_{cw}$ are scrambled by scramblers 120-1~120-$N_{cw}$, and mapped to modulation symbols by modulation mappers 130-1~130-$N_{cw}$. The modulation symbols are mapped to v layers by a layer mapper 140. A precoder 150 maps v layer signals to P signals corresponding to P antenna ports by a predetermined precoder. P resource mappers 160-1~160-P map the precoded signals to predetermined time-frequency resources, and Orthogonal Frequency Division Multiplexing (OFDM) generators 170-1~170-P convert outputs of the resource mappers 160-1~160-P into P OFDM symbol signals corresponding to P antenna ports.

Referring to FIG. 1B, an antenna mapper 180 maps P OFDM symbol signals corresponding to antenna ports, to $N_T$ Digital to Analog Converters (DACs) 190-1~190-$N_T$ corresponding to $N_T$ actual antennas according to predetermined rules. The analog signals output from the DACs 190-1~190-$N_T$ are converted into signals in an RF band which is a frequency band desired by mixers 192-1~192-$N_T$, and radiated into the air by antennas 196-1~196-$N_T$ after being power-amplified by Power Amplifiers (PAs) 194-1~194-$N_T$.

Figure 1C:
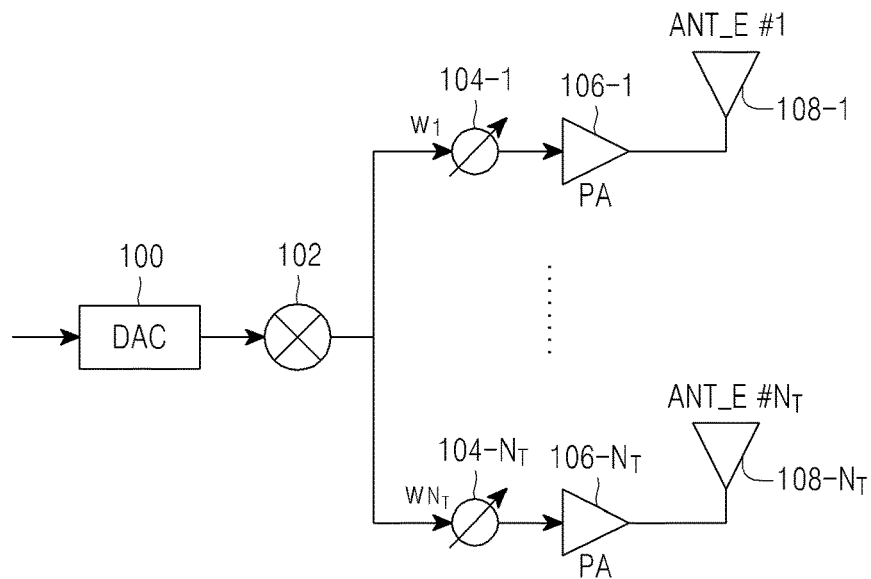
FIG. 1C schematically shows a transmission structure for performing analog beamforming according to an exemplary embodiment of the present invention.

FIG. 1C schematically shows a transmission structure for performing analog beamforming according to an exemplary embodiment of the present invention.

Referring to FIG. 1C, a DAC 100 converts a digital signal, to be transmitted, into an analog signal, and the analog signal is converted into an RF signal by a mixer 102. The RF signal forms antenna beams by being phase-adjusted by individual phase shift values w1~w$N_T$ by phase adjusters 104-1~104-$N_T$ corresponding to $N_T$ Antenna Elements (ANT_E) 108-1~108-$N_T$, respectively. The outputs of the phase adjusters 104-1~104-$N_T$ are radiated into the air by the antenna elements 108-1~108-$N_T$ after being power-amplified by power amplifiers 106-1~106-$N_T$. The number of, and the directions and intensities of the antenna beams which are radiated into the air are controlled by the phase shift values.

An exemplary transceiver structure is disclosed below, which may obtain a very high antenna gain by performing analog beamforming using a large number of antennas, and may also increase the communication performance by flexibly coping with a variety of user and channel environments with the use of various digital multi-antenna signal processing technologies and multiple access technologies.

Figure 2:
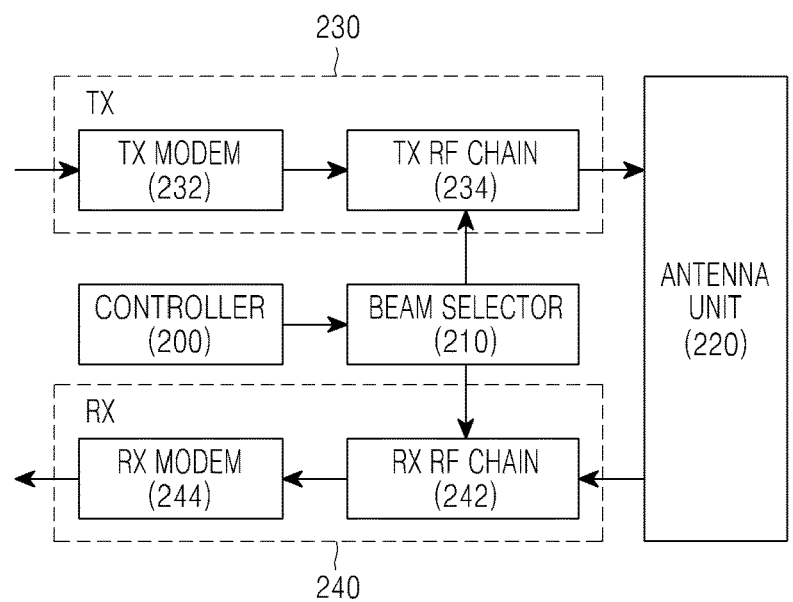
FIG. 2 shows a structure of a transceiver according to an exemplary embodiment of the present invention.

FIG. 2 shows a structure of a transceiver according to an exemplary embodiment of the present invention.

Referring to FIG. 2, the transceiver includes a controller 200, a beam selector 210, an antenna unit 220, a transmitting part 230, and a receiving part 240. The controller 200 controls beams, which are transmitted and received by the transceiver. For example, if an optimal analog reception beam for receiving a signal transmitted by an opponent node is selected, the controller 200 controls the beam selector 210 to receive the signal by forming the selected optimal analog reception beam. As another example, if an opponent node selects an optimal analog transmission beam for receiving a signal from the transceiver, and announces the selected optimal analog transmission beam by providing feedback information, then the controller 200 controls the beam selector 210 to transmit a signal by forming the selected optimal analog transmission beam.

As another example, if it is desired to simultaneously receive signals from an opponent node via a plurality of analog reception beams ($J_R$>1), the controller 200 selects a plurality of optimal analog reception beams, and controls the beam selector 210 to receive the signals by forming the plurality of analog reception beams.

As another example, in a case where the transceiver transmits a signal simultaneously through a plurality of analog transmission beams ($J_T$>1), if an opponent node selects a plurality of analog transmission beams and announces the selection by providing feedback information, then the controller 200 controls the beam selector 210 to transmit the signal by forming the plurality of analog transmission beams selected by the opponent node. As another example, in a case where the transceiver transmits a signal simultaneously through a plurality of analog transmission beams ($J_T$>1), if a plurality of opponent nodes select one or more analog transmission beams and announce the selection by providing feedback information, then the controller 200 controls the beam selector 210 to transmit the signal by forming one or more analog transmission beams selected by the plurality of opponent nodes.

The beam selector 210 transfers selected beam pattern information to the transmitting part 230 during transmission beamforming, and transfers selected beam pattern information to the receiving part 240 during reception beamforming.

Figure 3:
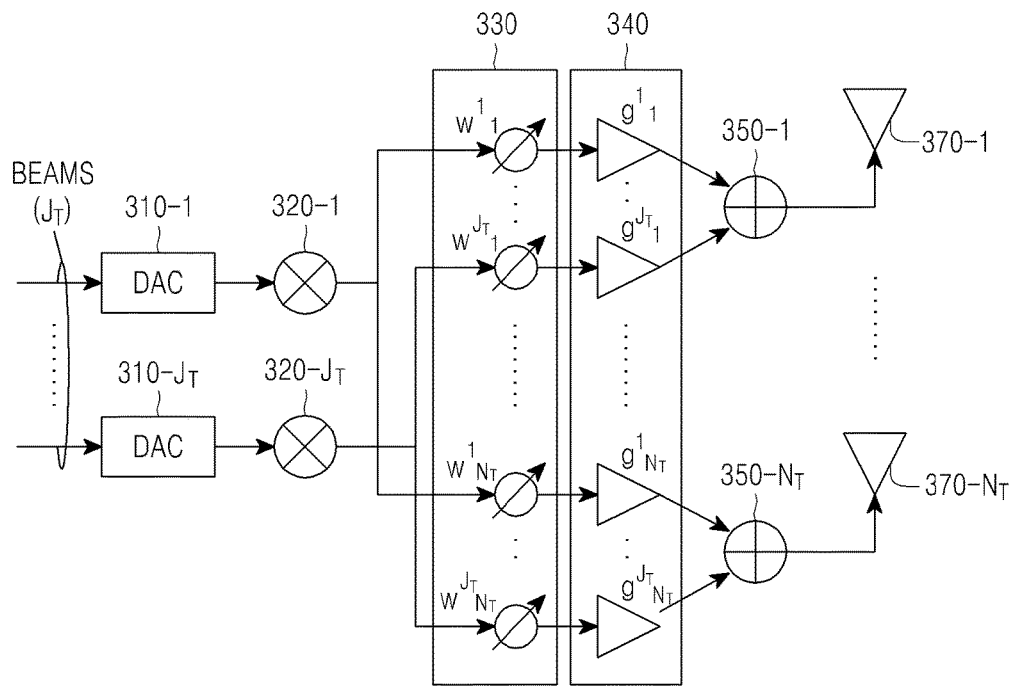
FIGS. 3 and 4 show transmission structures for simultaneously transmitting a plurality of antenna beams using multiple antennas according to exemplary embodiments of the present invention.
Figure 4:
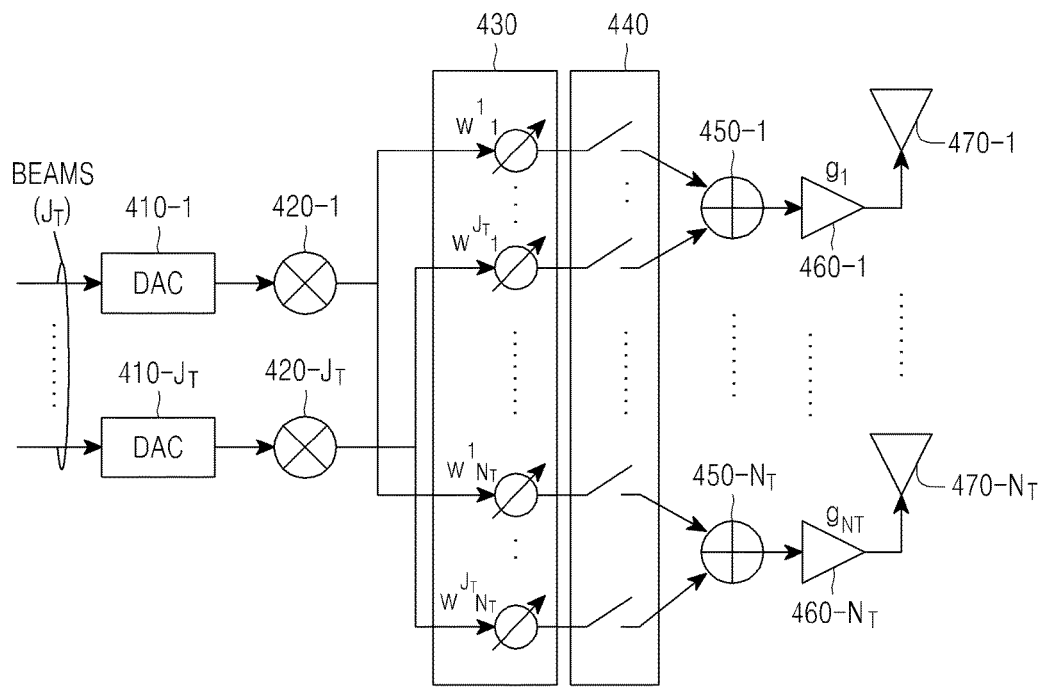
Figure 5:
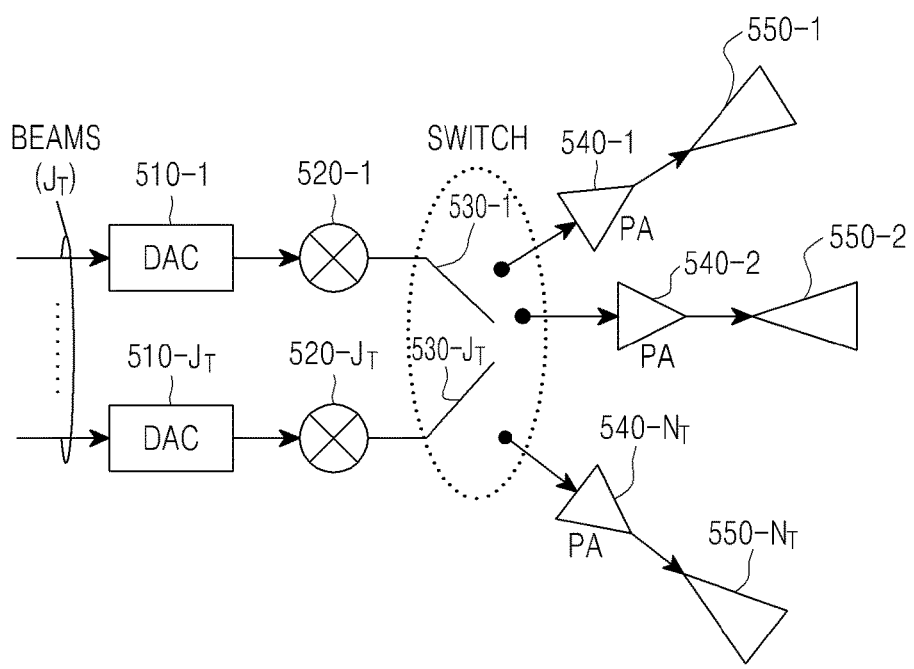
FIG. 5 shows a structure of a transmit Radio Frequency (RF) chain and an antenna unit for analog beamforming according to an exemplary embodiment of the present invention.

The antenna unit 220 includes a plurality of antenna elements. For example, the antenna unit 220 may include a plurality of omnidirectional antenna elements as shown in FIG. 3 or FIG. 4. As another example, the antenna unit 220 may include a plurality of directional antenna elements for transmitting their associated signals in different directions, as shown in FIG. 5.

The transmitting part 230 includes a transmit modem 232 and a transmit RF chain 234.

The transmit modem 232 encodes and modulates the data to be transmitted via the antenna unit 220, converts the modulated signal into an analog signal, and transfers the analog signal to the transmit RF chain 234. The analog signal is a baseband signal.

The transmit RF chain 234 includes a plurality of RF paths for transferring signals to their associated antenna elements. The transmit RF chain 234 may use only some antenna elements and some RF paths depending on the beam pattern and beam width selected by the beam selector 210.

The transmit RF chain 234 multiplexes the baseband signals provided from the transmit modem 232 to at least one activated RF path, and in each RF path, the transmit RF chain 234 converts the baseband signal into an RF signal, and transmits the RF signal via the antenna unit 220. The transmit RF chain 234 controls the baseband signal such that it may form a beam depending on the beam pattern selected by the beam selector 210. For example, if the antenna unit 220 includes a plurality of omnidirectional antenna elements as shown in FIG. 3 or FIG. 4, the transmit RF chain 234 includes a phase shifting unit for shifting a phase of the signal transmitted via an RF path for each antenna element. Each phase shifter constituting the phase shifting element shifts a phase of the signal to be transmitted via each antenna element depending on the beam pattern and beam width selected by the beam selector 210. The transmit RF chain 234 may obtain additional freedom in adjusting the pattern and width of the beam by adjusting a power amplification unit, an example of which is illustrated in FIG. 3 or a switching unit, an example of which is illustrated in FIG. 4.

As another example, if the antenna unit 220 includes a plurality of directional antenna elements as shown in FIG. 5, the transmit RF chain 234 includes switches that connect the transmit modem 232 to antenna elements depending on the beam pattern. Each of the switches connects the transmit modem 232 to at least one antenna element depending on the beam pattern and beam width selected by the beam selector 210. Each switch may connect the transmit modem 232 to at least one antenna element.

The receiving part 240 includes a receive RF chain 242 and a receive modem 244.

The receive RF chain 242 includes a plurality of RF paths for RF signals received via antenna elements. The receive RF chain 242 may use only some antenna elements and some RF paths depending on the beam pattern and beam width selected by the beam selector 210.

Figure 9:
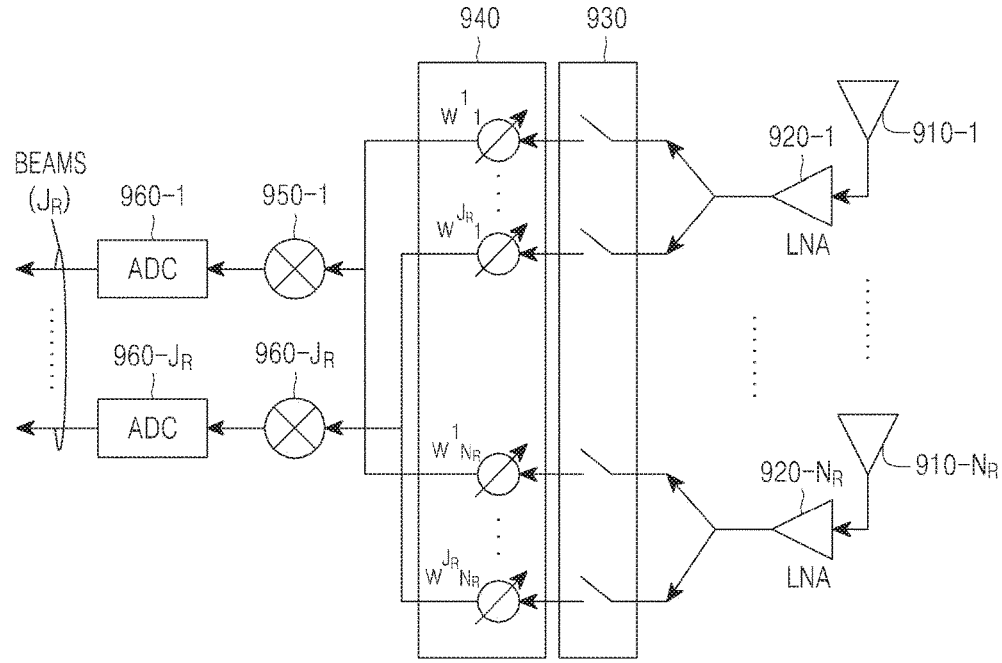
FIGS. 9 and 10 show reception structures for multi-beam analog processing according to exemplary embodiments of the present invention.

The receive RF chain 242 converts RF signals provided from the antenna elements into baseband signals, and transfers them to the receive modem 244. The receive RF chain 242 controls the baseband signals such that it may form a beam depending on the beam pattern selected by the beam selector 210. For example, if the antenna element 220 includes a plurality of omnidirectional antenna elements as shown in FIG. 9, the receive RF chain 242 includes a phase shifting unit for shifting a phase of a signal received via each antenna element. Each phase shifter included in the phase shifting unit shifts a phase of a signal received via each antenna element depending on the beam pattern and beam width selected by the beam selector 210.

FIGS. 3 and 4 show transmission structures for simultaneously transmitting a plurality of antenna beams using multiple antennas according to exemplary embodiments of the present invention. Each of the transmission structures corresponds to the transmit RF chain 234 and the antenna unit 220 in FIG. 2. More specifically, a phased-array antenna structure including $N_T$ antenna elements simultaneously transmits $J_T$ antenna beams, and the antenna beams are adjusted by shifting phases of the transmission signals.

Referring to FIG. 3, $J_T$ digital signals $y_k^j$ (where j= 1, ..., $J_T$), which are to be simultaneously transmitted via $J_T$ beams, are converted into analog signals $y^j(t)$ (where j=1, ... $J_T$) by $J_T$ DACs 310-1~310-$J_T$, and mixers 320-1~320-$J_T$ convert the analog signals into transmission signals in a desired transmission frequency band by multiplying the analog signals by a carrier frequency. In order to be transferred to $N_T$ antenna elements 370-1~370-$N_T$, transmission signals for individual beams are phase-shifted to match with the associated beams by the phase shifting unit 330. For example, transmission signals for a beam j are phase-shifted by a j-th phase shifter set among $J_T$ phase shifter sets included in the phase shifting unit 330. The j-th phase shifter set includes $N_T$ phase shifters, and shifts a phase of the transmission signals for the beam j by $w_1^j, \ldots, w_{N_T}^j$.

The power amplification unit 340 includes $J_T*N_T$ power amplifiers that correspond to beams and antennas and receive the outputs from the phase shifters. The power amplification unit 340 amplifies input signals and adjusts levels thereof individually for each beam and each antenna. For example, $N_T$ phase-shifted signals corresponding to a beam j are converted into signals $z_1^j(t), \ldots, z_{N_T}^j(t)$ as their signal levels are adjusted by $g_1^j, \ldots, g_{N_T}^j$, respectively. Some transmission signals may be blocked by setting their power control values $g_n^j$ to zero (0).

Summers 350-1~350-$N_T$ sum up $J_T$ power-amplified signals for each antenna element, and the antenna elements 370-1~370-$N_T$ transmit into the air the signals transferred from the summers 350-1~350-$N_T$, respectively. A signal transmitted from an antenna element n (where n=1, ..., $N_T$) is defined as Equation (1) below.

$$z_n(t) = \overset{J_T}{\underset{j=1}{Q}} z_n^j(t) \qquad \text{Equation (1)}$$

In the transmission structure, the width and direction of transmission beams are changed by adjusting $N_T$ phase shift values $w_1^j, \ldots, w_{N_T}^j$ and power control values $g_1^j, \ldots, g_{N_T}^j$. Therefore, a digital signal processing unit stores a combination of phase shift values and power control values corresponding to the width and direction of each beam, and designates a combination of phase shift values and power control values corresponding to the width and direction of the desired beam, in the phase shifting unit 330 and the power amplification unit 340.

Referring to FIG. 4, in another example of a transmission structure for analog beamforming, $J_T$ DACs 410-1~410-$J_T$ convert digital input signals, to be transmitted, into analog signals, and the analog signals are converted into transmission signals in RF band by mixers 420-1~420-$J_T$. A phase shifting unit 430 phase-shifts transmission signals for each beam by phase shift values designated by $N_T$ phase shifters.

The switching unit 440 transfers or blocks transmission signals corresponding to each beam to/from summers 450-1~450-$N_T$ under predetermined control. The summers 450-1~450-$N_T$ sum up transmission signals transferred from the switching unit 440 individually for each antenna element, and input the summation results to power amplifiers 460-1~460-$N_T$. The power amplifiers 460-1~460-$N_T$ amplify input signals corresponding to each antenna element and adjust their levels. For example, a level of a signal corresponding to an antenna element n is adjusted by gn (where n=1, ..., $N_T$). The antenna elements 470-1~470-$N_T$ transmit into the air the signals delivered from the power amplifiers 460-1~460-$N_T$, respectively. The switching unit 440 is optional.

FIG. 5 shows a structure of a transmit RF chain and an antenna unit for analog beamforming according to an exemplary embodiment of the present invention.

Referring to FIG. 5, the transmission structure arranges a plurality of directional antennas 550-1, 550-2, ..., 550-$N_T$ in different directions, and selects antennas via which signals are transmitted, with switches 530-1, ..., 530-$J_T$, thereby adjusting the direction and width of each beam. Furthermore, $J_T$ DACs 510-1~510-$J_T$ convert digital input signals to be transmitted, into analog signals, and the analog signals are converted into transmission signals in an RF band by mixers 520-1~520-$J_T$. Each of the switches 530-1, ..., 530-$J_T$ connects a transmission signal corresponding to each beam to any one of the $N_T$ transmit antennas 550-1~550-

$N_T$ under predetermined control. Power amplifiers 540-1~540-$N_T$ amplify input signals delivered via the switching unit 530 and corresponding to the transmit antennas 550-1~550-$N_T$, adjust their levels, and connect the amplified and level-adjusted signals to their associated transmit antennas 550-1~550-$N_T$. For example, a level of a signal corresponding to an antenna element n is adjusted by gn (where n=1, . . . , $N_T$). The antenna elements 550-1~550-$N_T$ transmit into the air the signals delivered from the power amplifiers 540-1~540-$N_T$.

Connection combinations between $J_T$ beams and $N_T$ transmit antennas are designated and stored in advance, and the switches 530-1~530-$J_T$ operate depending on the switching pattern selected to correspond to the connection combinations. Although the power amplifiers 540-1~540-$N_T$ are assumed to be interposed between the switches 530-1~530-$J_T$ and the transmit antennas 550-1~550-$N_T$, the power amplifiers 540-1~540-$N_T$ may be interposed between the mixers 520-1~520-$J_T$ and the switches 530-1~530-$J_T$ in an alternative exemplary embodiment.

Figure 6:
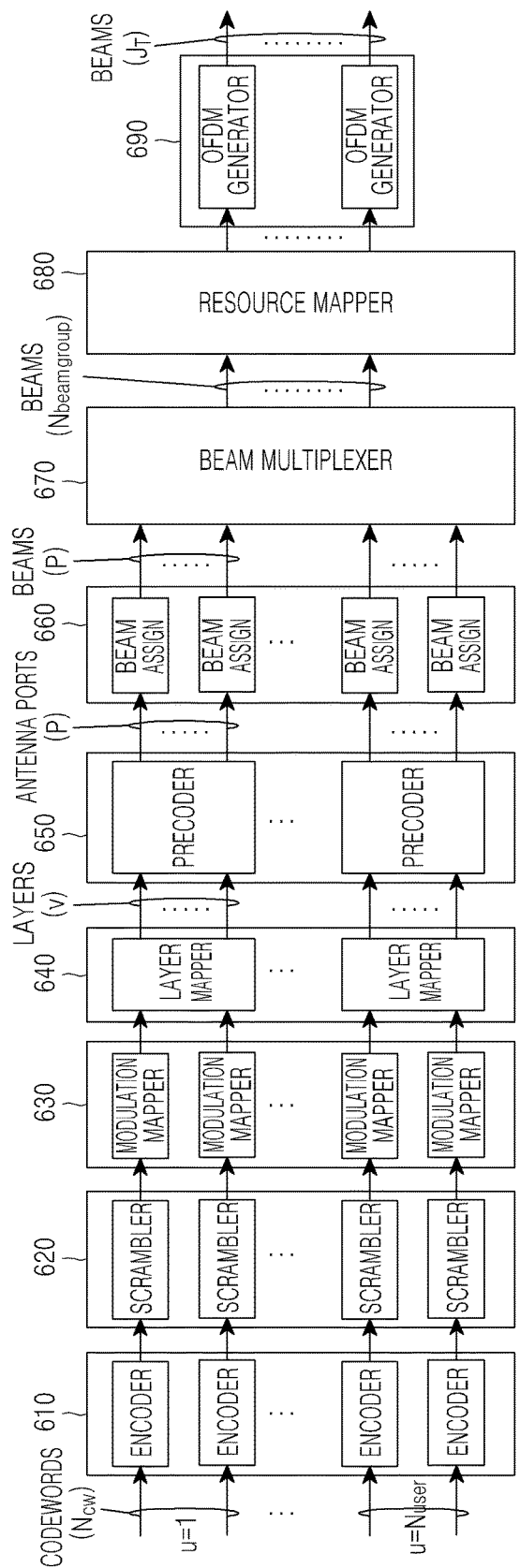
FIG. 6 shows a structure of a transmit modem for digital signal processing in a multi-antenna system according to an exemplary embodiment of the present invention.

FIG. 6 shows a structure of a transmit modem for digital signal processing in a multi-antenna system according to an exemplary embodiment of the present invention.

Referring to FIG. 6, this structure uses $N_{cw}$ transport channels for each user, in order to transmit data to receivers (i.e., users or receive stations) for $N_{user}$ users. In addition, for data transmission, v layers and P virtual antennas (i.e., antenna ports) are used for each user, and $J_T$ beams may be formed for all users. Furthermore, $N_{cw}$ codewords for each user are input to an encoding unit 610 and encoded therein by an error correcting code. A scrambling unit 620 scrambles output bits of the encoding unit 610 by multiplying them by a random scrambling code sequence of 0 or 1 that a receiver may generate. A modulation mapping unit 630 maps the scrambled bits to modulation symbols according to the predetermined modulation scheme such as Quadrature Amplitude Modulation (QAM) and Phase Shift Keying (PSK).

A layer mapping unit 640 maps a modulation symbol sequence for each user to a predetermined number, v, of layers, and a precoding unit 650 maps v layer signals to P signals corresponding to P antenna ports by predetermined coders. A beam assignment unit 660 assigns the precoded signals from the precoding unit 650 to P beams, for each user. A beam multiplexer 670 multiplexes P*$N_{user}$ precoded signals beam-assigned for $N_{user}$ users, to $N_{beamgroup}$ beam groups depending on the sameness (or equality) of the antenna beam combination ($N_{beamgroup} \leq N_{user}$).

A resource mapper 680 maps the beam group signals, which are generated by the beam multiplexing, to predetermined time-frequency resources, and an OFDM generation unit 690 independently converts the outputs of the resource mapper 680 into OFDM symbol signals corresponding to $J_T$ beams, and outputs the OFDM symbol signals to an analog processing unit (not shown). As an example, the analog processing unit may be configured as shown in any one of FIGS. 3 to 5.

The signal conversion performed in FIG. 6 will be described in more detail below.

An exemplary process of generating a scrambled bit sequence of $b'^{(q)}(0), \ldots, b'^{(q)}(M_{bit}^{(q)}-1)$, which is the result obtained by scrambling a coded bit sequence of $b^{(q)}(0), \ldots, b^{(q)}(M_{bit}^{(q)}-1)$, q=0, . . . , $N_{cw}-1$ for $N_{cw}$ transport channels, where $M_{bit}^{(q)}$ denotes the number of bits for a transport channel q, is shown in Equation (2) below.

$$b'^{(q)}(i)=(b^{(q)}(i)+c^{(q)}(i)) \bmod 2$$

$$i=0, \ldots, M_{bit}^{(q)}-1, q=0, \ldots, N_{cw}-1 \quad \text{Equation (2)}$$

The scrambling code sequence $c^{(q)}(i)$ is generated according to the predetermined rules agreed in advance between a transmitter and a receiver, and the predetermined rules denote, for example, information about an initial value of the scrambling code sequence. The initial value of the scrambling code sequence may be designated equally for all receivers in the cell, but differently for each cell. In an alternative exemplary embodiment, the initial value of the scrambling code sequence may be designated differently for each cell and each receiver. For example, an initial value $c_{init}$ of the scrambling code sequence is designated as shown in Equation (3) below, $$c_{init}=n_{RNTI}E2^{14}+qE2^{13}+*n_s/2+E2^9+N_{ID}^{cell} \quad \text{Equation (3)}$$

where $n_{RNTI}$ denotes a unique number or a Radio Network Temporary Identifier (RNTI) for identifying a receiver (i.e., a receive station), q denotes the number of codewords, $n_s$ denotes a slot number, and $N_{ID}^{cell}$ denotes a physical identifier of a cell.

The scrambling allows a specific receiver for its cell to decode bits of only a specific codeword, prevents the decoding by another receiver for its cell, or by a receiver for another cell, and prevents the decoding for a bit sequence of another codeword for the receiver. In addition, the scrambling may increase the performance with the same encoder and decoder, by ensuring robustness against bit errors.

The layer mapping unit 640 converts a modulation symbol sequence of $d^{(q)}(0), \ldots, d^{(q)}(M_{bit}^{(q)}-1)$ (q=0, . . . , $N_{cw}-1$) for $N_{cw}$ transport channels into v modulation symbol groups of $x^{(0)}(i), \ldots, x^{(v-1)}(i), i=0, \ldots, M_{symb}^{layer}-1$, where $M_{symb}^{layer}$ denotes the number of modulation symbols transmitted over each layer.

If the number, v, of layers is greater than 1, v QAM or PSK symbols are simultaneously transmitted to a receiver via a plurality of antennas with the same time and frequency resources, guaranteeing Spatial Multiplexing (SM) gain by which a data rate increases v times, compared to when only one symbol is transmitted. Layer mapping may be performed as shown in, for example, Table 1 below.

TABLE 1

| Number of Layers (v) | Number of Codewords ($N_{cw}$) | Codeword-Layer Mapping | |
|---|---|---|---|
| 1 | 1 | $X^{(0)}(i) = d^{(0)}(i)$ | $M_{symb}^{layer} = M_{symb}^{(0)}$ |
| 2 | 1 | $X^{(0)}(i) = d^{(0)}(2i)$<br>$X^{(1)}(i) = d^{(0)}(2i + 1)$ | $M_{symb}^{layer} = M_{symb}^{(0)}/2$ |
| 2 | 2 | $X^{(0)}(i) = d^{(0)}(i)$<br>$X^{(1)}(i) = d^{(1)}(i)$ | $M_{symb}^{layer} = M_{symb}^{(0)} = M_{symb}^{(1)}$ |
| 3 | 1 | $X^{(0)}(i) = d^{(0)}(3i)$<br>$X^{(1)}(i) = d^{(1)}(3i + 1)$<br>$X^{(2)}(i) = d^{(2)}(3i + 2)$ | $M_{symb}^{layer} = M_{symb}^{(0)}/3$ |
| 3 | 2 | $X^{(0)}(i) = d^{(0)}(i)$<br>$X^{(1)}(i) = d^{(1)}(2i)$<br>$X^{(2)}(i) = d^{(1)}(2i + 1)$ | $M_{symb}^{layer} = M_{symb}^{(0)} = M_{symb}^{(1)}/2$ |
| 4 | 1 | $X^{(0)}(i) = d^{(0)}(4i)$<br>$X^{(1)}(i) = d^{(1)}(4i + 1)$<br>$X^{(2)}(i) = d^{(2)}(4i + 2)$<br>$X^{(3)}(i) = d^{(3)}(4i + 3)$ | $M_{symb}^{layer} = M_{symb}^{(0)}/4$ |
| 4 | 2 | $X^{(0)}(i) = d^{(0)}(2i)$<br>$X^{(1)}(i) = d^{(0)}(2i + 1)$<br>$X^{(2)}(i) = d^{(1)}(2i)$<br>$X^{(3)}(i) = d^{(1)}(2i + 1)$ | $M_{symb}^{layer} = M_{symb}^{(0)}/2 = M_{symb}^{(1)}/2$ |
| 5 | 2 | $X^{(0)}(i) = d^{(0)}(2i)$<br>$X^{(1)}(i) = d^{(0)}(2i + 1)$<br>$X^{(2)}(i) = d^{(1)}(3i)$ | $M_{symb}^{layer} = M_{symb}^{(0)}/2 = M_{symb}^{(1)}/3$ |

TABLE 1-continued

| Number of Layers (v) | Number of Codewords ($N_{cw}$) | Codeword-Layer Mapping |  |
|---|---|---|---|
|  |  | $X^{(3)}(i) = d^{(1)}(3i + 1)$ |  |
|  |  | $X^{(4)}(i) = d^{(1)}(3i + 2)$ |  |
| 6 | 2 | $X^{(0)}(i) = d^{(0)}(3i)$ | $M_{symb}{}^{layer} = M_{symb}{}^{(0)}/3 = M_{symb}{}^{(1)}/3$ |
|  |  | $X^{(1)}(i) = d^{(0)}(3i + 1)$ |  |
|  |  | $X^{(2)}(i) = d^{(0)}(3i + 2)$ |  |
|  |  | $X^{(3)}(i) = d^{(1)}(3i)$ |  |
|  |  | $X^{(4)}(i) = d^{(1)}(3i + 1)$ |  |
|  |  | $X^{(5)}(i) = d^{(1)}(3i + 2)$ |  |
| 7 | 2 | $X^{(0)}(i) = d^{(0)}(3i)$ | $M_{symb}{}^{layer} = M_{symb}{}^{(0)}/3 = M_{symb}{}^{(1)}/4$ |
|  |  | $X^{(1)}(i) = d^{(0)}(3i + 1)$ |  |
|  |  | $X^{(2)}(i) = d^{(0)}(3i + 2)$ |  |
|  |  | $X^{(3)}(i) = d^{(1)}(4i)$ |  |
|  |  | $X^{(4)}(i) = d^{(1)}(4i + 1)$ |  |
|  |  | $X^{(5)}(i) = d^{(1)}(4i + 2)$ |  |
|  |  | $X^{(6)}(i) = d^{(1)}(4i + 3)$ |  |
| 8 | 2 | $X^{(0)}(i) = d^{(0)}(4i)$ | $M_{symb}{}^{layer} = M_{symb}{}^{(0)}/4 = M_{symb}{}^{(1)}/4$ |
|  |  | $X^{(1)}(i) = d^{(0)}(4i + 1)$ |  |
|  |  | $X^{(2)}(i) = d^{(0)}(4i + 2)$ |  |
|  |  | $X^{(3)}(i) = d^{(0)}(4i + 3)$ |  |
|  |  | $X^{(4)}(i) = d^{(1)}(4i)$ |  |
|  |  | $X^{(5)}(i) = d^{(1)}(4i + 1)$ |  |
|  |  | $X^{(6)}(i) = d^{(1)}(4i + 2)$ |  |
|  |  | $X^{(7)}(i) = d^{(1)}(4i + 3)$ |  |

The precoding unit 650 permutes layer-mapped modulation symbol groups according to the predetermined rules or multiplies them by a precoding matrix (also called a precoder), and if necessary, converts them into signal groups of $y_{(0)}(i), \ldots, y^{(P-1)}(i)$, $i=0, \ldots, M_{symb}{}^{ap}-1$ each consisting of P signals having complex values by adding a Cyclic Delay Diversity (CDD) code. Here, $M_{symb}{}^{ap}$ denotes the number of modulation symbols transferred to each antenna port.

The precoded signals are mapped to antenna ports or virtual antennas. If the number, P, of antenna ports is the same as the number, v, of layers and is greater than 1, Single User-Multiple Input Multiple Output (SU-MIMO) is supported, which transmits data of P=v transport channels to a single user via P antenna ports. If P>v, the transmit antenna diversity effect or the digital transmit antenna beamforming effect may be obtained by the precoding. For example, precoding may be shown as in Equation (4) below.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \quad \text{Equation (4)}$$

An example of precoding that adds CDD may be shown as in Equation (5) below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{Equation (5)}$$

In Equation (5), W(i) notes a precoding matrix with a size of P*v, D(i) denotes a matrix with a size of v*v, used to support CDD, and U denotes a matrix with a size of v*v, which is given in advance to support different numbers of layers.

The matrixes D(i) and U may be determined as shown in, for example, Table 2 below.

TABLE 2

| (v) | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi/3} & 0 \\ 0 & 0 & e^{-j4\pi/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi/4} & 0 & 0 \\ 0 & 0 & e^{-j4\pi/4} & 0 \\ 0 & 0 & 0 & e^{-j6\pi/4} \end{bmatrix}$ |

The beam assignment unit 660 designates an antenna beam $\varphi(u,p)$ (where $u=0, 1, \ldots,$ Nuser-1, and $p=0, 1, \ldots, P-1$) that will transmit a signal for each antenna port p for each receiver u. If the beam assignment unit 660 selects an antenna beam, phase shift values (in FIG. 3 or FIG. 4) are selected or a switching pattern (in FIG. 5) is selected in the analog processing unit depending on the selected beam. The antenna beam may be selected based on the results that a receiver feeds back by measuring a level of a received signal.

The beam multiplexer 670 multiplexes the signals in the same antenna beam combination among the precoded signals for $N_{user}$ receivers, to the same beam group. The beam group made by the multiplexing may be represented as $\varphi(u')=\{\varphi(u',p)|p=0, 1, \ldots, P-1\}$, and $u'=0, 1, \ldots, N_{beamgroup}-1$. By multiplexing the precoded signals for the users using the same antenna beam combination, to the same beam group, the transmission structure may designate a plurality of user signals by FDM in the same resource assignment time. More specifically, an antenna beam combination including P antenna beams is assigned to each user, and the beam multiplexer 670 compares antenna beam combinations for users with each other, and multiplexes signals for the users whose P antenna beams are all the same, to one beam group.

For P>v, especially for P=mv (where m=2, 3, . . . ), the transmission structure may transmit signals for m users with the same frequency and/or same beam group for the same time by applying Multi-User (MU)-MIMO technology. An optimal precoding matrix for MU-MIMO may be obtained by applying a variety of conventional MU-MIMO technologies. In other words, the beam multiplexer 670 may support optimized resource assignment by simultaneously assigning resources to multiple users that use the same beam group, by FDM or MU-MIMO.

For transmission over $J_T$ antenna beams, the resource mapper 680 assigns time and frequency resources, corresponding to $J_T$ OFDM symbols, to its input signals, where $J_T \geq P$. Depending on the resource assignment unit, the resources of OFDM symbols may be assigned in units of individual OFDM symbols, or in units of slots each consisting of a plurality of OFDM symbols. In this way, the resource mapper 680 may basically support TDM that assigns time resources in units of slots or OFDM symbols. More specifically, the signals, which are classified as the same beam group by beam multiplexing, are mapped to OFDM symbols in the same (slot) time. Signals belonging to different beam groups are mapped to OFDM symbols in different (slot) times, or mapped to different resources in the same slot or OFDM symbol time. Interference between the simultaneously transmitted beams needs to be minimized.

For $J_T$=P, signals of only one beam group may be transmitted. In this case, FDM or MU-MIMO is supported. For $J_T$>P, especially for $J_T$=mP (where m=2, 3, . . . ), Spatial Division Multiplexing (SDM) is additionally supported, which transmits signals to multiple users with different beams in the same time and frequency. The transmission structure shown in FIG. 6 has the conditions of $J_T$=P*$N_{sdm}$, where $N_{sdm}$ denotes the number of beam groups which are transmitted by SDM for the same resource assignment time.

Figure 7:
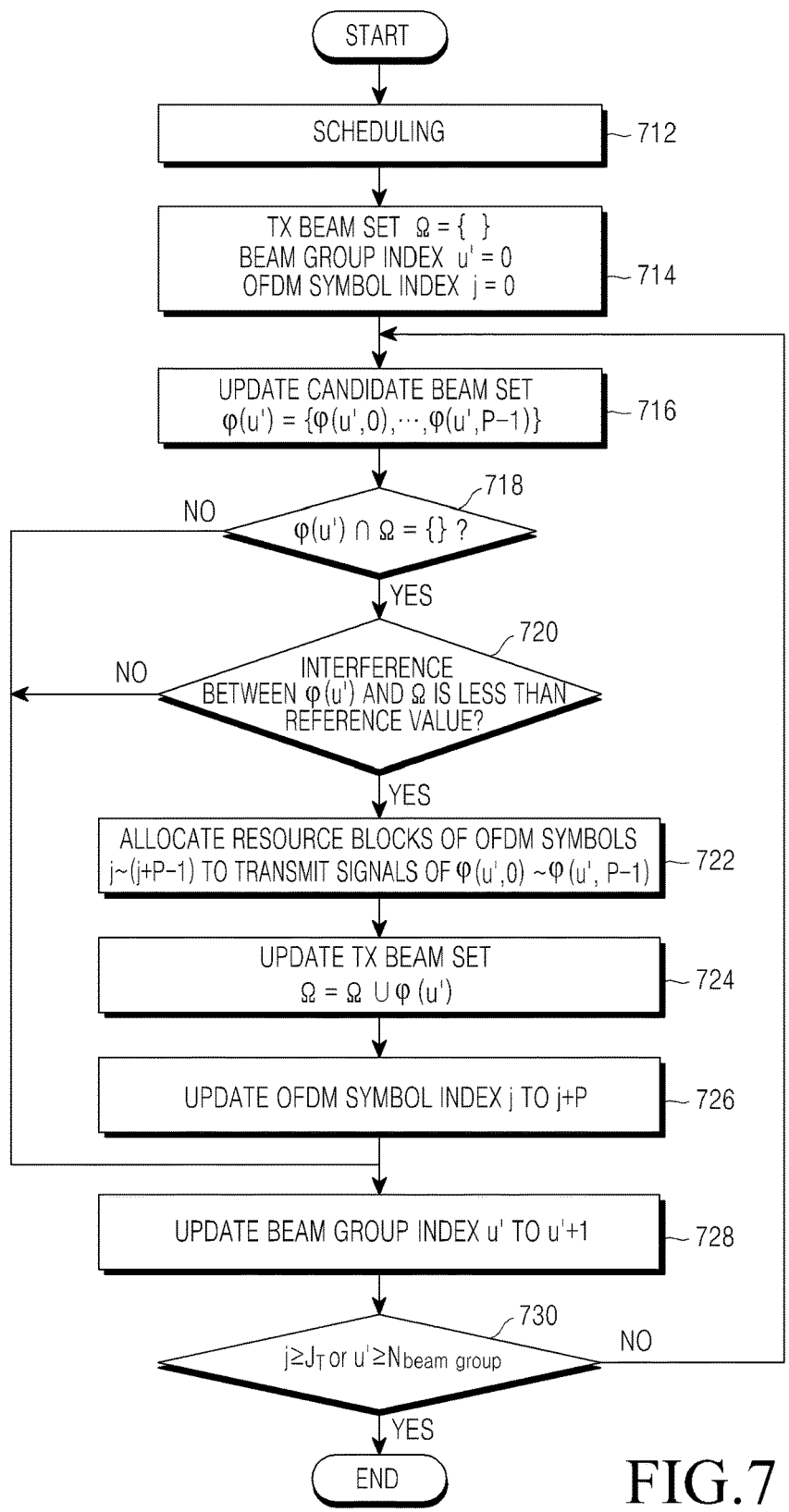
FIG. 7 shows an operation of a resource mapper according to an exemplary embodiment of the present invention.

FIG. 7 shows an operation of a resource mapper according to an exemplary embodiment of the present invention.

Referring to FIG. 7, when a Transmit Time Interval (TTI) or slot defined as a resource assignment period starts, a scheduler (not shown, but included in the resource mapper by way of example) designates priorities of beam groups by performing scheduling according to a predetermined scheduling algorithm, in step 712. Signals in each beam group have the same antenna beam combination, and beam groups are indexed in order of the priority by scheduling.

In step 714, parameters for the resource assignment algorithm are initialized. For example, a transmission beam set Ω is initialized to an empty set of { }, a beam group index u' is initialized to zero (0), and an OFDM symbol index j is initialized to zero (0).

In step 716, the resource mapper designates a new candidate transmission beam group φ(u') by a beam group index u' as φ(u',0), . . . , φ(u',P−1). In step 718, the resource mapper determines if the new candidate transmission beam group includes beams that are totally different from those in the selected existing transmission beam set Ω. If the new candidate transmission beam group includes only the completely new beams which are different from the selected existing beams, the resource mapper determines in step 720 whether interference between the new candidate transmission beam group and the selected existing transmission beam set is less than a predetermined reference value. If the interference between the beams is less than the reference value, the resource mapper assigns resource blocks of OFDM symbols j, . . . , j+P−1 to transmit signals yφ (u',0), . . . , yφ(u',P−1) of φ(u',0), . . . , φ(u',P−1) in step 722. The resource mapper adds beams in the new candidate transmission beam group φ(u') to the transmission beam set Ω, in step 724, increases the OFDM symbol index by P in step 726 (j=j+P), and increases the beam group index by 1 in step 728 (u'u'+1).

On the other hand, if one or more beams in the new candidate beam group overlap with the selected existing beams in step 718, the resource mapper directly proceeds to step 728. Also, if interference between the beams is not less than the reference value in step 720, the resource mapper directly proceeds to step 728.

In step 730, the resource mapper determines whether it has assigned resources of all assignable OFDM symbols (j≥$J_T$), or whether it has considered transmission of all candidate transmission beam groups (u'≥$N_{beamgroup}$). If so, resource assignment for a given TTI or slot is completed. If not, the resource mapper returns to step 716.

The resource assignment algorithm of FIG. 7 may be modified in various different ways. As an example, in step 720, the resource assignment algorithm may optimize a precoding unit to minimize inter-beam interference, to maximize its signal level, or to maximize a sum rate. As another example, the resource assignment algorithm may employ a variety of conventional optimization technologies.

Figure 8:
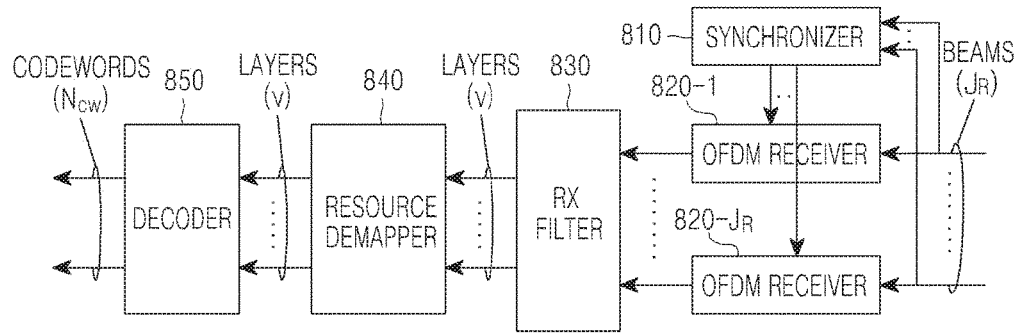
FIG. 8 shows a structure of a receiving modem for multi-beam digital signal processing according to an exemplary embodiment of the present invention.

FIG. 8 shows a structure of a receive modem for multi-beam digital signal processing according to an exemplary embodiment of the present invention.

Referring to FIG. 8, $J_R$ reception beams received via a receive antenna unit (not shown) are received at a synchronizer 810 and $J_R$ OFDM receivers 820-1~820-$J_R$. The synchronizer 810 acquires synchronization of a transmitter using the reception beams, and provides information about the synchronization to the OFDM receivers 820-1~820-$J_R$. The OFDM receivers 820-1~820-$J_R$ output $J_R$ OFDM symbol signals by individually performing OFDM reception processing on digital signals received through the $J_R$ reception beams according to the synchronization.

A receive filter 830 obtains v received signals transmitted from a transmitter and corresponding to v layers by performing reception filtering processing on the $J_R$ OFDM symbol signals. Although not illustrated, if $J_R$>v, digital reception beamforming technology may be additionally applied for the v signals. A resource demapper 840 performs permutation so that a decoder 850 may process the received signals. The decoder 850 obtains bit streams (i.e., codewords) for $N_{cw}$ transport channels by decoding the received signals delivered from the resource demapper 840. The receive filter 830 and the resource demapper 840 are interchangeable with each other in terms of position.

Figure 10:
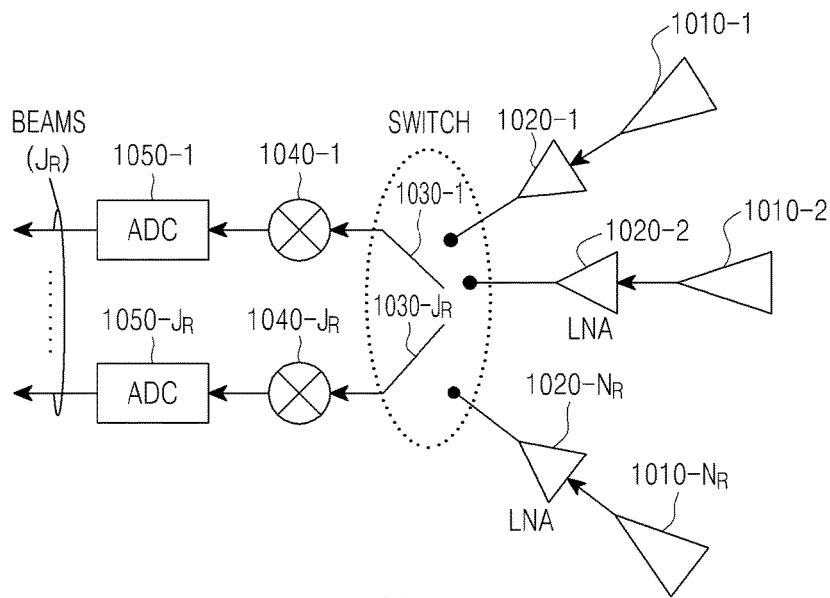

FIGS. 9 and 10 show reception structures for multi-beam analog processing according to exemplary embodiments of the present invention.

Referring to FIG. 9, signals, which are simultaneously received via $N_R$ antenna elements 910-1~910-$N_R$, are received as $J_R$ beams through analog reception beamforming by a switching unit 930 and a phase shifting unit 940 after passing through $N_R$ Low Noise Amplifiers (LNAs) 920-1~920-$N_R$. More specifically, the switching unit 930 includes $N_R$*$J_R$ switches, and for each antenna element, selectively inputs its received signals to associated $J_R$ phase shifters included in the phase shifting unit 940 by on/off controlling the received signals. The phase shifting unit 940, using the individual phase shifters, outputs $J_R$ reception beam signals by applying phase shift values $w_1^1$~$w_1^{JR}$, . . . , $w_{NR}^1$~$w_{NR}^{JR}$ determined by a digital processing unit, to the signals received via the switching unit 930. The $J_R$ signals output by the phase shifting unit 940 are input to $J_R$ mixers 950-1~950-$J_R$. The $J_R$ mixers 950-1~950-$J_R$ combine the $J_R$ signals received from the phase shifting unit 940, and output the mixed signals to the $J_R$ ADCs 960-1~960-$J_R$. The reception beam signals are converted into digital reception beam signals by the ADCs 960-1~960-$J_R$. The switching unit 930 is optional.

FIG. 10 shows a reception structure that uses a plurality of directional antennas according to an exemplary embodiment of the present invention.

Referring to FIG. 10, $N_R$ directional antenna elements 1010-1~1010-$N_R$ are arranged in different directions depending on the predetermined gap and positions. Switches 1030-1~1030-$J_R$ adjust the direction and width of reception beams by selecting at least one antenna element via which the reception structure is to receive a signal. Signals received via the $N_R$ antenna elements 1010-1~1010-$N_R$ are received as $J_R$ reception beam signals by means of $J_R$ switches 1030-1~1030-$J_R$ after passing through $N_R$ LNAs 1020-1~1020-$N_R$. Each switch connects one or more different received signals among the $N_R$ received signals that have passed through the LNAs 1020-1~1020-$N_R$, to one of mixers 1040-1~1040-$J_R$. The $J_R$ mixers 1040-1~1040-$J_R$ frequency-convert RF reception beam signals received via the switches 1030-1~1030-$J_R$ into baseband signals, and the baseband signals are converted into digital signals by $J_R$ ADCs 1050-1~1050-$J_R$ and transferred to a receive modem.

Figure 11:
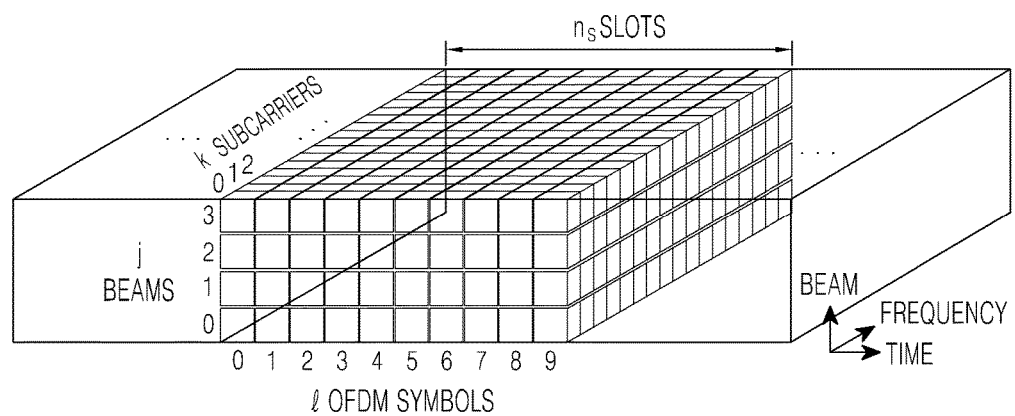
FIG. 11 shows a resource structure for transmitting signals according to an exemplary embodiment of the present invention.

FIG. 11 shows a resource structure for transmitting signals according to an exemplary embodiment of the present invention.

Referring to FIG. 11, 10 OFDM symbols may be transmitted with each beam in every slot or every TTI. Resources are assigned in one slot in units of 10 OFDM symbols. In each slot, 10 OFDM symbols are transmitted through the same beam. Each of the OFDM symbols may occupy k subcarriers. In an alternative exemplary embodiment, the beam may be switched in every OFDM symbol.

FIGS. 12 to 20 show combinations of analog beamforming and digital antenna signal processing structures supportable for $J_T$=4 according to exemplary embodiments of the present invention, where $J_T$ denotes the number of transmission beams. The illustrated exemplary structures support both TDM and FDM, and additionally support SDM for $N_{sdm}$=$J_T$/P and MU-MIMO for P/v users.

FIGS. 12 to 17 show structures for $N_{cw}$=1 indicating that one transport channel is used for each user.

Figure 12:
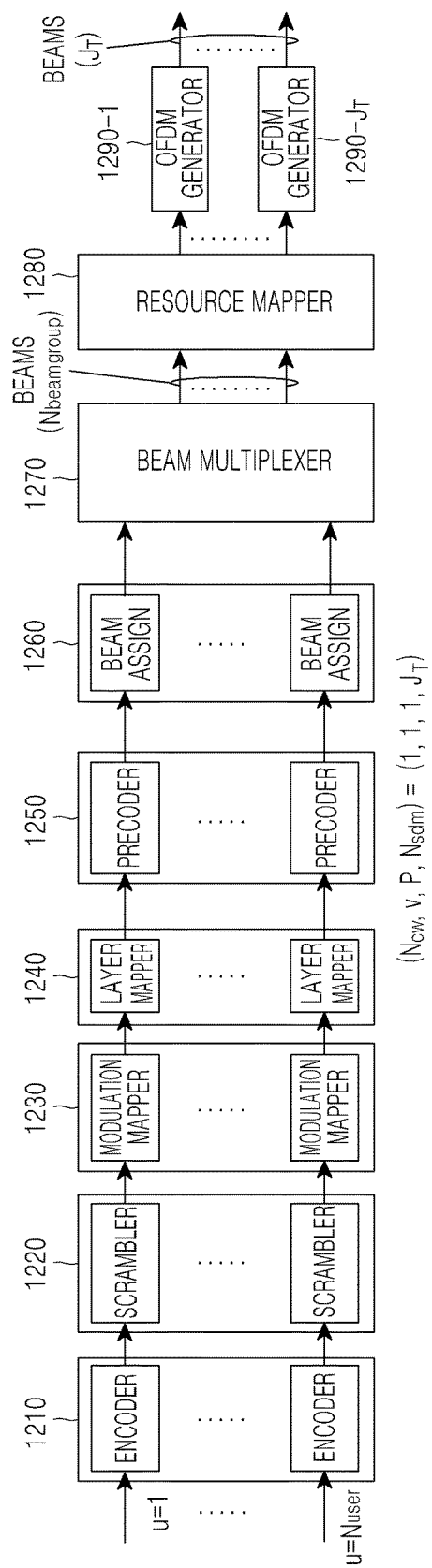
FIG. 12 shows a transmission structure for $(N_{cw}, v, P, N_{sdm}) = (1,1,1,J_T)$ according to an exemplary embodiment of the present invention.

FIG. 12 shows a transmission structure for ($N_{cw}$,v,P, $N_{sdm}$)= (1,1,1,$J_T$) according to an exemplary embodiment of the present invention. In the illustrated example, this transmission structure simultaneously transmits signals to $J_T$=4 users by SDM.

Referring to FIG. 12, $N_{user}$ codewords for $N_{user}$ users are individually encoded by an error correcting code in an encoding unit 1210. A scrambling unit 1220 scrambles the output bits of the encoding unit 1210 by multiplying them by a scrambling code sequence, and a modulation mapping unit 1230 maps the scrambled bits to modulation symbols according to the predetermined modulation scheme.

A layer mapping unit 1240 maps a modulation symbol sequence for each user to one associated layer, and a precoding unit 1250 maps each layer signal to one antenna port signal by a predetermined precoder. A beam assignment unit 1260 assigns one beam to each precoded signal from the precoding unit 1250, and a beam multiplexer 1270 multiplexes the signals, beam-assigned for $N_{user}$ users, to $N_{beamgroup}$ beam groups depending on the sameness of the antenna beam combination.

A resource mapper 1280 maps the beam-multiplexed signals to predetermined time-frequency resources, and OFDM generators 1290-1~1290-$J_T$ individually convert the outputs of the resource mapper 1280 into OFDM symbol signals corresponding to $J_T$ beams and output the OFDM symbol signals to an analog processing unit (not shown).

In the structure shown, the layer mapping unit 1240 and the precoding unit 1250 are optional, because a signal for each user corresponds to one layer and one layer port.

Figure 13:
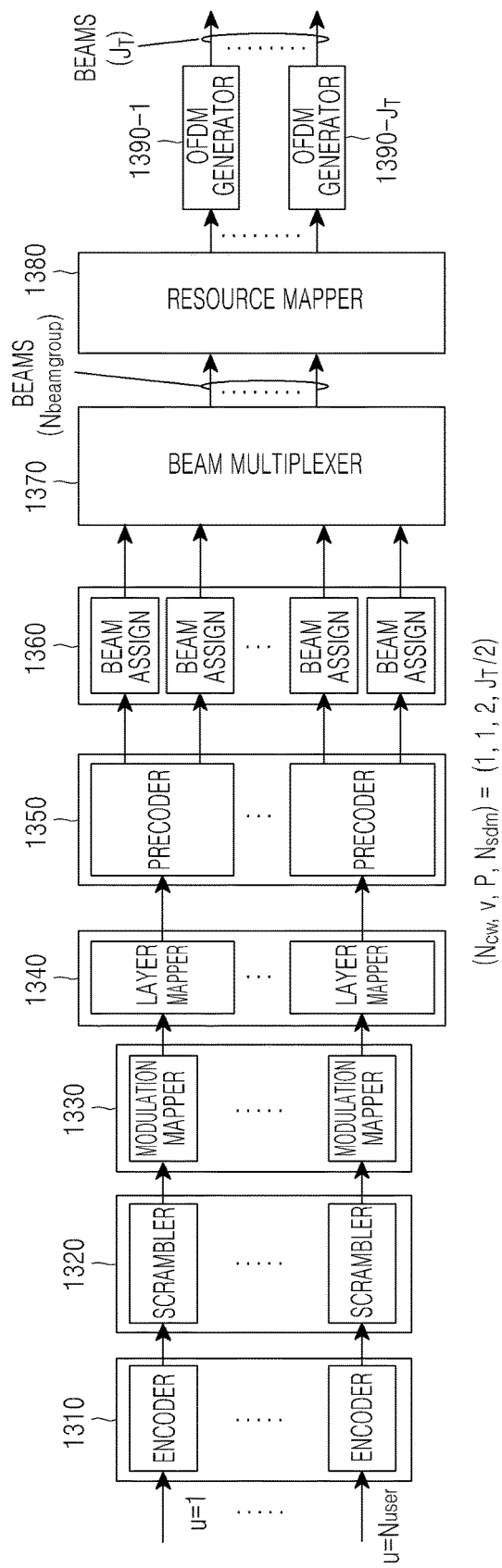
FIG. 13 shows a transmission structure for $(N_{cw}, v, P, N_{sdm}) = (1,1,2,J_T/2)$ according to an exemplary embodiment of the present invention.

FIG. 13 shows a transmission structure for ($N_{cw}$,v,P, $N_{sdm}$)= (1,1,2,$J_T$/2) according to an exemplary embodiment of the present invention. In the illustrated example, this transmission structure may simultaneously provide digital beamforming by precoding for P=2, to $J_T$/2=2 users by SDM.

Referring to FIG. 13, $N_{user}$ codewords for $N_{user}$ users are individually encoded by an error correcting code in an encoding unit 1310. A scrambling unit 1320 scrambles the output bits of the encoding unit 1310 by multiplying them by a scrambling code sequence, and a modulation mapping unit 1330 maps the scrambled bits to modulation symbols according to the predetermined modulation scheme.

A layer mapping unit 1340 maps a modulation symbol sequence for each user to one associated layer, and a precoding unit 1350 maps each layer signal to two antenna port signals by a predetermined precoder. A beam assignment unit 1360 assigns one beam to each precoded signal from the precoding unit 1350, and a beam multiplexer 1370 multiplexes 2*$N_{user}$ signals beam-assigned for $N_{user}$ users, to $N_{beamgroup}$ beam groups depending on the sameness of the antenna beam combination.

A resource mapper 1380 maps the beam-multiplexed signals to predetermined time-frequency resources, and OFDM generation units 1390-1~1390-$J_T$ convert the outputs of the resource mapper 1380 into OFDM symbol signals corresponding to $J_T$ beams, respectively, and output the OFDM symbol signals to an analog processing unit.

This structure may transmit a 1-layer signal to a total of 4 stations, since it may simultaneously support not only SDM but also 1-layer MU-MIMO, for two stations by precoding for P=2. For similar reasons as described with reference to FIG. 12, the layer mapping unit 1340 is optional.

Figure 14:
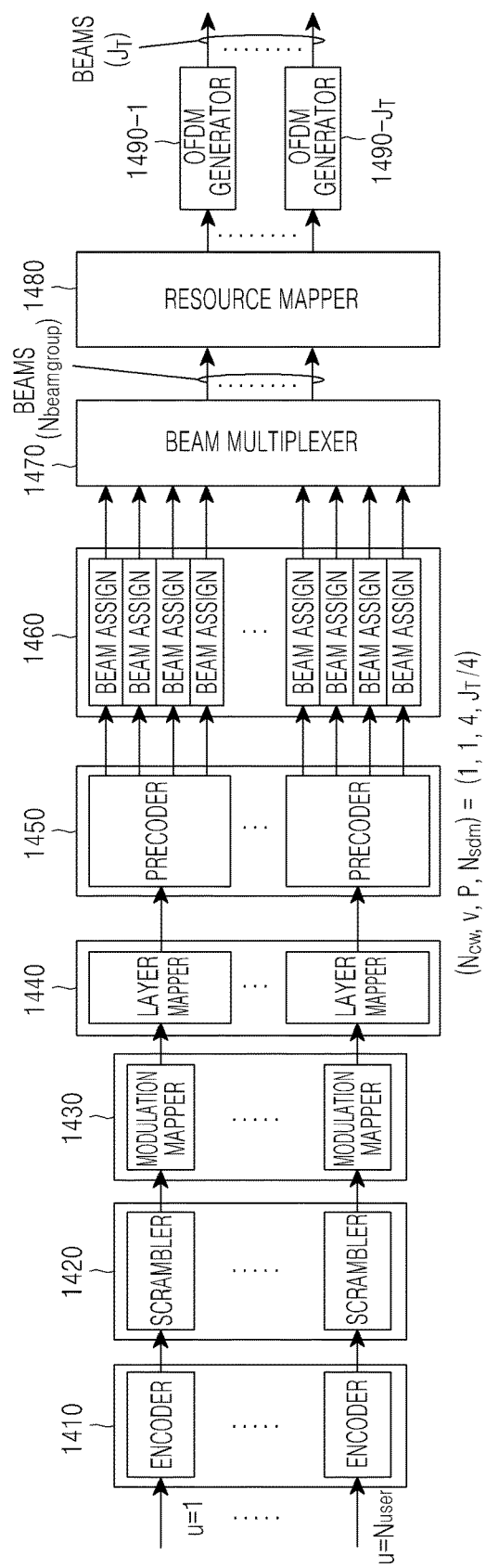
FIG. 14 shows a transmission structure for $(N_{cw}, v, P, N_{sdm}) = (1,1,4,J_T/4)$ according to an exemplary embodiment of the present invention.

FIG. 14 shows a transmission structure for ($N_{cw}$,v,P, $N_{sdm}$)= (1,1,4,$J_T$/4) according to an exemplary embodiment of the present invention. In the illustrated example, this transmission structure provides digital beamforming to $J_T$/4=1 user by precoding for P=4. In addition, this structure may support layer-1 MU-MIMO for four users.

Referring to FIG. 14, $N_{user}$ codewords for $N_{user}$ users are individually encoded by an error correcting code in an encoding unit 1410. A scrambling unit 1420 scrambles the output bits of the encoding unit 1410 by multiplying them by a scrambling code sequence, and a modulation mapping unit 1430 maps the scrambled bits to modulation symbols according to the predetermined modulation scheme.

A layer mapping unit 1440 maps a modulation symbol sequence for each user to one associated layer, and a precoding unit 1450 maps each layer signal to 4 antenna port signals by a predetermined precoder. A beam assignment unit 1460 assigns one beam to each precoded signal from the precoding unit 1450, and a beam multiplexer 1470 multiplexes 4*$N_{user}$ signals beam-assigned for $N_{user}$ users, to $N_{beamgroup}$ beam groups depending on the sameness of the antenna beam combination.

A resource mapper 1480 maps the beam-multiplexed signals to predetermined time-frequency resources, and OFDM generation units 1490-1~1490-$J_T$ convert the outputs of the resource mapper 1480 into OFDM symbol signals corresponding to $J_T$ beams, respectively, and output them to an analog processing unit.

Although the transmission structure in FIG. 14 obtains results similar to the structure of FIG. 12, the transmission structure in FIG. 14 is different from the transmission structure in FIG. 12 in terms of the antenna beam selection and precoder optimization process. For the similar reasons, the layer mapping unit 1440 is optional.

Figure 15:
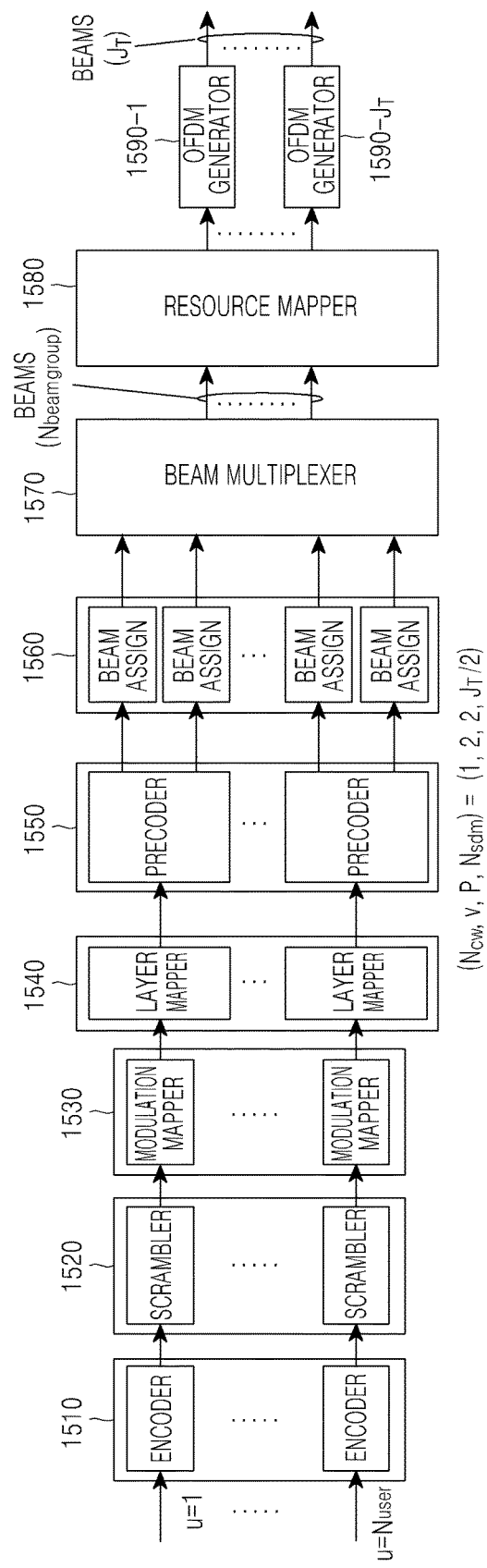
FIG. 15 shows a transmission structure for $(N_{cw}, v, P, N_{sdm}) = (1,2,2,J_T/2)$ according to an exemplary embodiment of the present invention.

FIG. 15 shows a transmission structure for ($N_{cw}$,v,P, $N_{sdm}$)= (1,2,2,$J_T$/2) according to an exemplary embodiment of the present invention. In the illustrated example, this transmission structure simultaneously transmits signals to two users by SDM, and provides SM SU-MIMO for v=2 to each user, where v denotes the number of layers.

Referring to FIG. 15, $N_{user}$ codewords for $N_{user}$ users are individually encoded by an error correcting code in an encoding unit 1510. A scrambling unit 1520 scrambles the output bits of the encoding unit 1510 by multiplying them by a scrambling code sequence, and a modulation mapping unit 1530 maps the scrambled bits to modulation symbols according to the predetermined modulation scheme.

A layer mapping unit 1540 maps a modulation symbol sequence for each user to two layers, and a precoding unit 1550 maps each layer signal to one antenna port signal by a predetermined precoder. The transmission structure transmits two modulation symbols to each user with each time and frequency resource, since the number of layers for each user is v=2. A beam assignment unit 1560 assigns one beam to each precoded signal from the precoding unit 1550, and a beam multiplexer 1570 multiplexes $2*N_{user}$ signals beam-assigned for $N_{user}$ users, to $N_{beamgroup}$ beam groups depending on the sameness of the antenna beam combination.

A resource mapper 1580 maps the beam-multiplexed signals to predetermined time-frequency resources, and OFDM generation units 1590-1~1590-$J_T$ convert the outputs of the resource mapper 1580 into OFDM symbol signals corresponding to $J_T$ beams, respectively, and output them to an analog processing unit (not shown).

Figure 16:
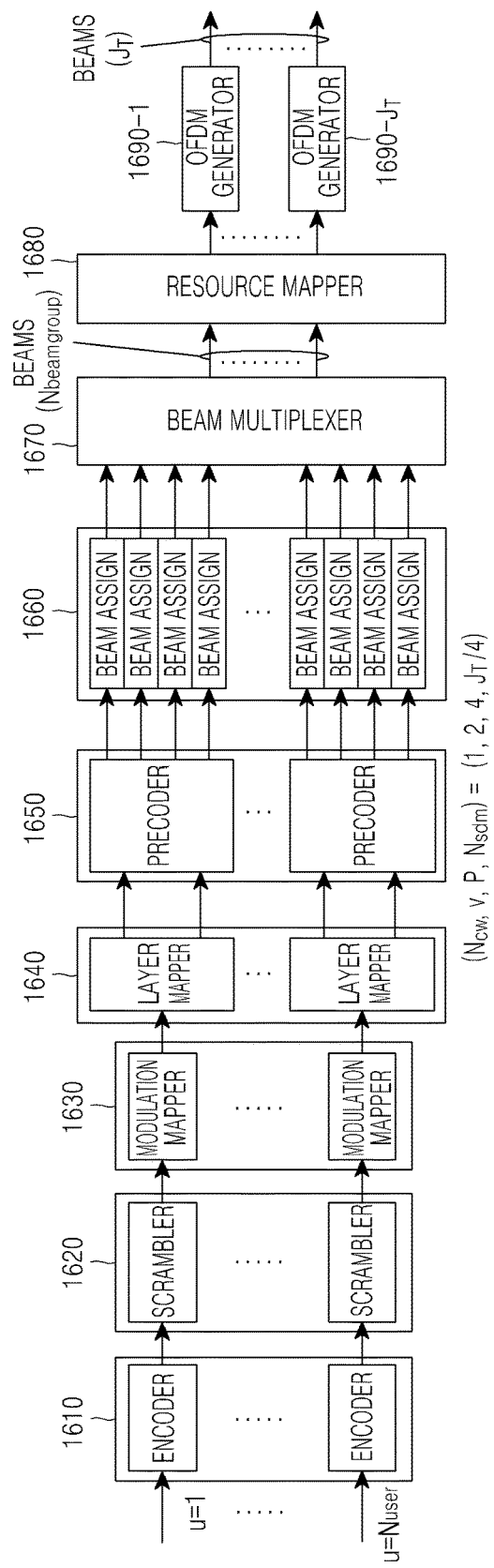
FIG. 16 shows a transmission structure for $(N_{cw}, v, P, N_{sdm}) = (1,2,4,J_T/4)$ according to an exemplary embodiment of the present invention.

FIG. 16 shows a transmission structure for ($N_{cw}$,v,P, $N_{sdm}$)= (1,2,4,$J_T$/4) according to an exemplary embodiment of the present invention. In the illustrated example, this transmission structure supports SM SU-MIMO for v=2 for one user with each time and frequency resource, where v denotes the number of layers, and additionally provides not only analog beamforming but also digital beamforming by precoding. In addition, the illustrated exemplary transmission structure may provide 2-layer MU-MIMO to two users with each time and frequency resource. In this case, this transmission structure is the same in data rate, compared with the transmission structure in FIG. 15 that transmits signals to two users by SDM, but the two transmission structures are different in terms of the antenna beam selection and precoder optimization process.

Referring to FIG. 16, $N_{user}$ codewords for $N_{user}$ users are individually encoded by an error correcting code in an encoding unit 1610. A scrambling unit 1620 scrambles the output bits of the encoding unit 1610 by multiplying them by a scrambling code sequence, and a modulation mapping unit 1630 maps the scrambled bits to modulation symbols according to the predetermined modulation scheme.

A layer mapping unit 1640 maps a modulation symbol sequence for each user to two layers, and a precoding unit 1650 maps two layer signals to four antenna port signals by a predetermined precoder. The transmission structure transmits 2 modulation symbols to each user with each time and frequency resource since the number of layers for each user is v=2. A beam assignment unit 1660 assigns one beam to each precoded signal from the precoding unit 1650, and a beam multiplexer 1670 multiplexes $4*N_{user}$ signals beam-assigned for $N_{user}$ users, to $N_{beamgroup}$ beam groups depending on the sameness of the antenna beam combination.

A resource mapper 1680 maps the beam-multiplexed signals to predetermined time-frequency resources, and OFDM generation units 1690-1~1690-$J_T$ convert the outputs of the resource mapper 1680 into OFDM symbol signals corresponding to $J_T$ beams, respectively, and output them to an analog processing unit.

Figure 17:
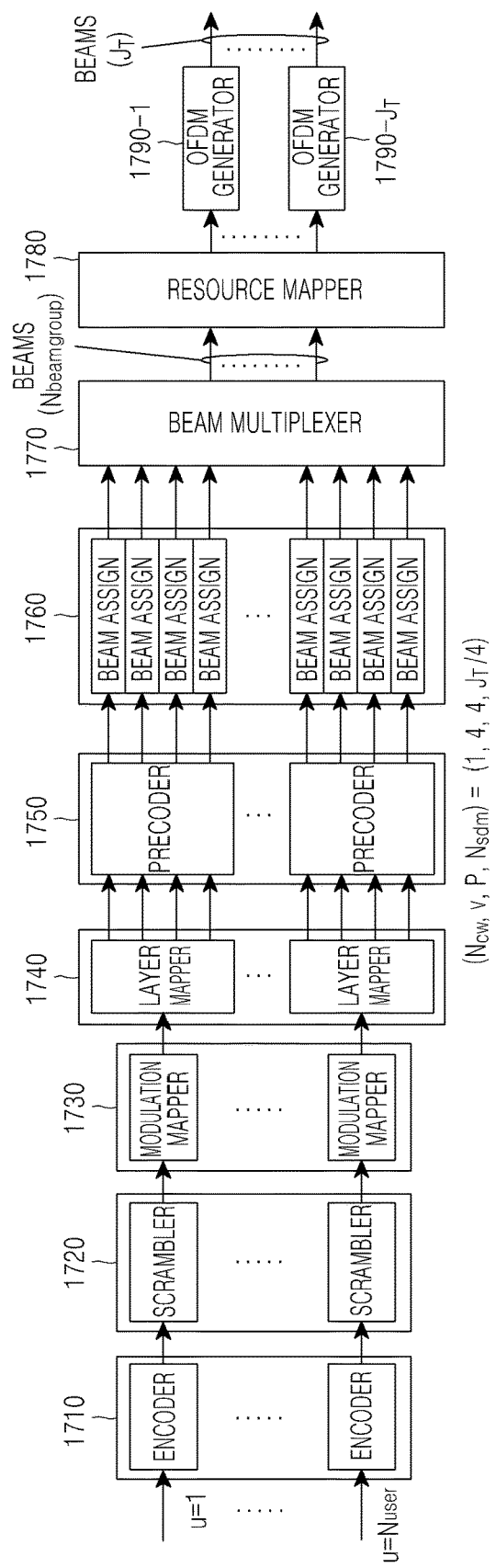
FIG. 17 shows a transmission structure for $(N_{cw}, v, P, N_{sdm}) = (1,4,4,J_T/4)$ according to an exemplary embodiment of the present invention.

FIG. 17 shows a transmission structure for ($N_{cw}$,v,P, $N_{sdm}$)= (1,4,4,$J_T$/4) according to an exemplary embodiment of the present invention. In the illustrated example, this transmission structure provides SU-MIMO for v=4 to one user with each time and frequency resource, where v denotes the number layers.

Referring to FIG. 17, $N_{user}$ codewords for $N_{user}$ users are individually encoded by an error correcting code in an encoding unit 1710. A scrambling unit 1720 scrambles the output bits of the encoding unit 1710 by multiplying them by a scrambling code sequence, and a modulation mapping unit 1730 maps the scrambled bits to modulation symbols according to the predetermined modulation scheme.

A layer mapping unit 1740 maps a modulation symbol sequence for each user to 4 layers, and a precoding unit 1750 maps each layer signal to one antenna port signal by a predetermined precoder. The transmission structure transmits 4 modulation symbols to each user with each time and frequency resource since the number of layers for each user is v=4. A beam assignment unit 1760 assigns one beam to each precoded signal from the precoding unit 1750, and a beam multiplexer 1770 multiplexes $4*N_{user}$ signals beam-assigned for $N_{user}$ users, to $N_{beamgroup}$ beam groups depending on the sameness of the antenna beam combination.

A resource mapper 1780 maps the beam-multiplexed signals to predetermined time-frequency resources, and OFDM generation units 1790-1~1790-$J_T$ convert the outputs of the resource mapper 1780 into OFDM symbol signals corresponding to $J_T$ beams, respectively, and output them to an analog processing unit (not shown).

Figure 18:
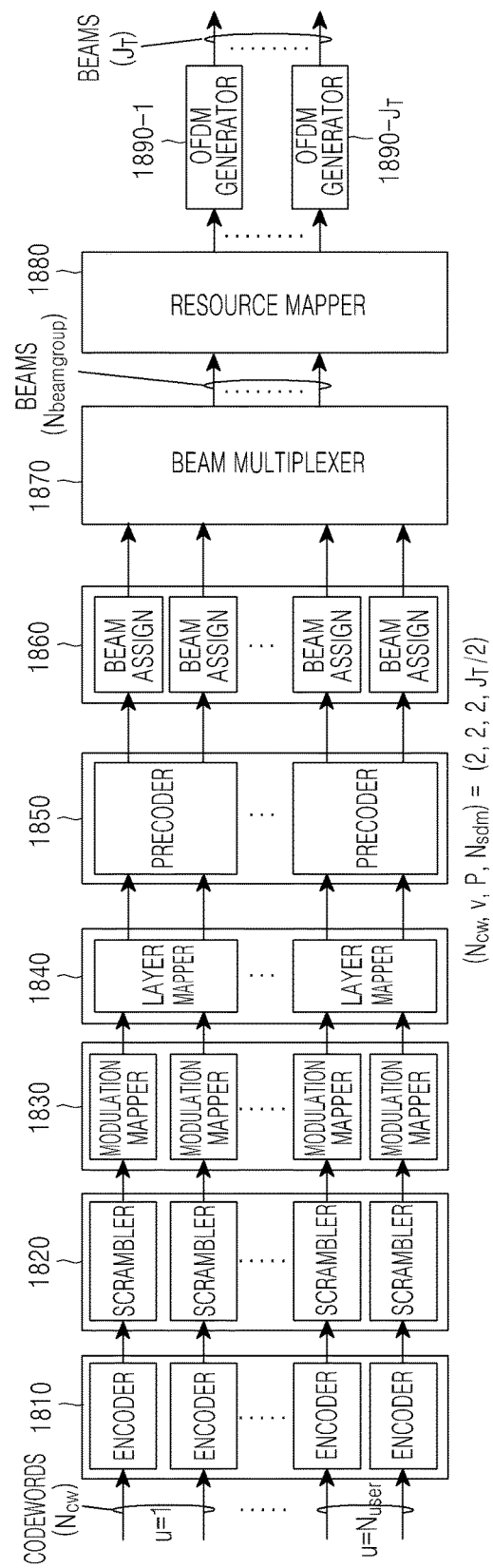
FIG. 18 shows a transmission structure for $(N_{cw}, v, P, N_{sdm}) = (2,2,2,J_T/2)$ according to an exemplary embodiment of the present invention.
Figure 19:
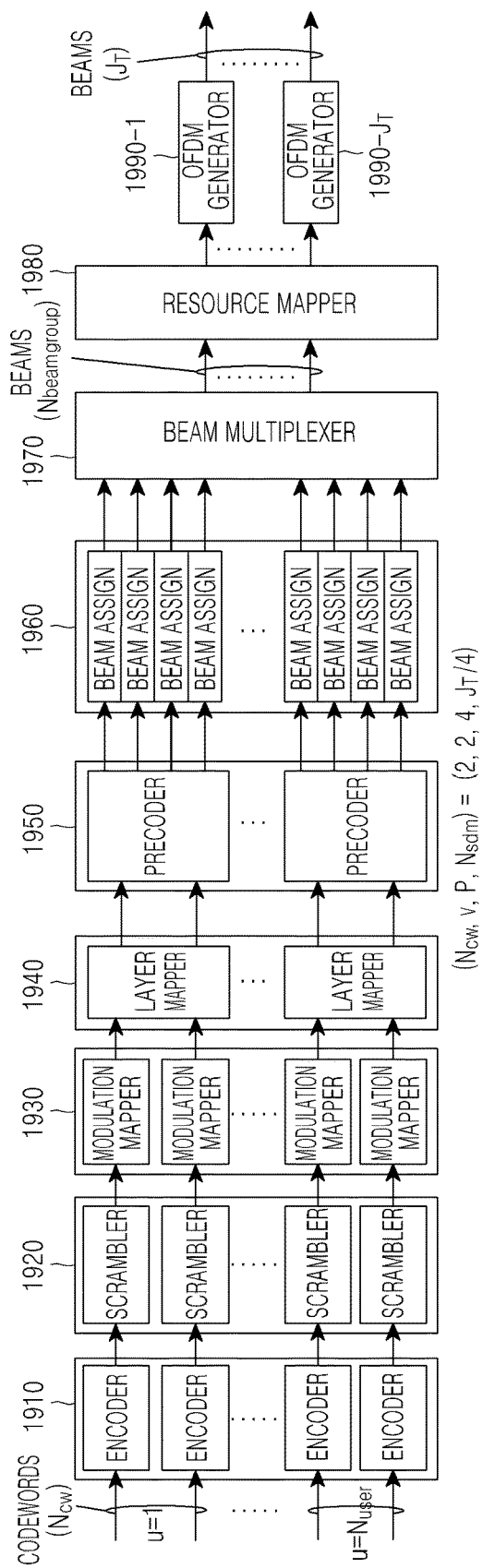
FIG. 19 shows a transmission structure for $(N_{cw}, v, P, N_{sdm}) = (2,2,4,J_T/4)$ according to an exemplary embodiment of the present invention.
Figure 20:
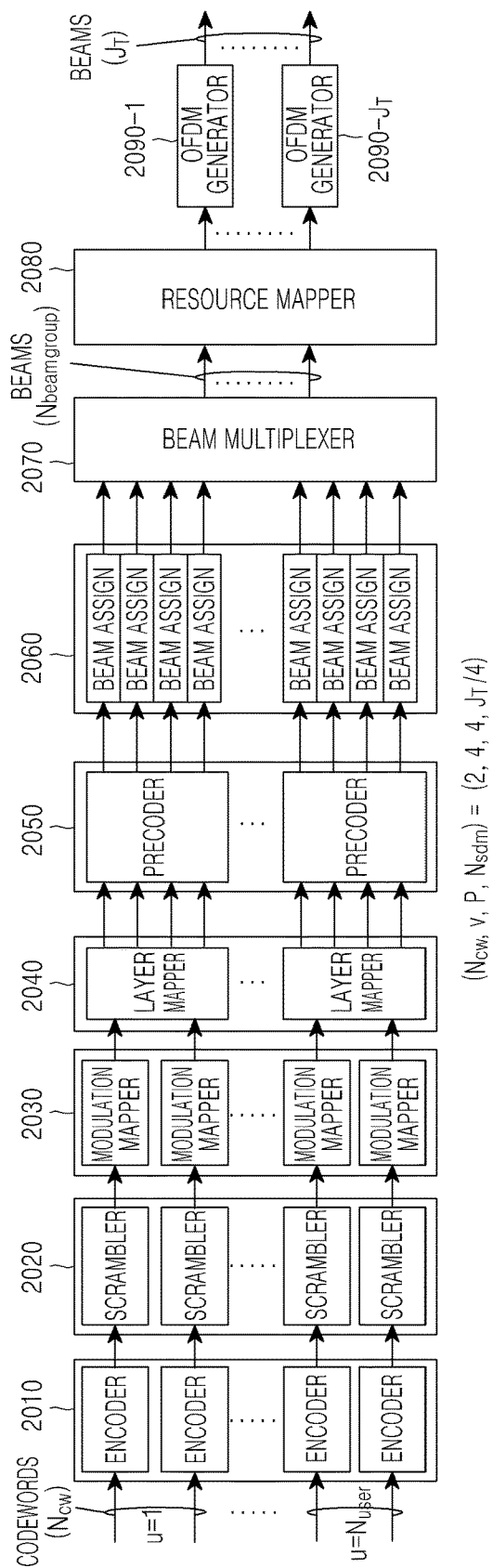
FIG. 20 shows a transmission structure for $(N_{cw}, v, P, N_{sdm}) = (2,4,4,J_T/4)$ according to an exemplary embodiment of the present invention.

FIGS. 18 to 20 show structures for $N_{cw}$=2 indicating that two transport channels are used for each user.

FIG. 18 shows a transmission structure for ($N_{cw}$,v,P, $N_{sdm}$)= (2,2,2,$J_T$/2) according to an exemplary embodiment of the present invention. In the illustrated example, this transmission structure simultaneously transmits signals to two users by SMD and supports SM SU-MIMO for v=2 for each user, where v denotes the number of layers.

Referring to FIG. 18, codewords for each user are individually encoded by an error correcting code in each encoder in an encoding unit 1810. A scrambling unit 1820 scrambles the output bits of the encoding unit 1810 by multiplying them by a scrambling code sequence, and a modulation mapping unit 1830 maps the scrambled bits to modulation symbols according to the predetermined modulation scheme.

A layer mapping unit 1840 maps two modulation symbol sequences for each user to two layers, and a precoding unit 1850 maps each layer signal to one antenna port signal by a predetermined precoder. A beam assignment unit 1860 assigns one beam to each precoded signal from the precoding unit 1850, and a beam multiplexer 1870 multiplexes $2*N_{user}$ signals beam-assigned for $N_{user}$ users, to $N_{beamgroup}$ beam groups depending on the sameness of the antenna beam combination.

A resource mapper 1880 maps the beam-multiplexed signals to predetermined time-frequency resources, and OFDM generation units 1890-1~1890-$J_T$ convert the outputs of the resource mapper 1880 into OFDM symbol signals corresponding to $J_T$ beams, respectively, and output them to an analog processing unit.

FIG. 19 shows a transmission structure for ($N_{cw}$,v,P, $N_{sdm}$)= (2,2,4,$J_T$/4) according to an exemplary embodiment of the present invention. In the illustrated example, this transmission structure provides SM SU-MIMO for v=2 to one user with each time and frequency resource, where v denotes the number of layers, and additionally provides not only analog beamforming but also digital beamforming by precoding. In addition, the transmission structure shown may provide 2-layer MU-MIMO to two users with each time and frequency resource. In this case, this transmission structure is the same in data rate, compared with the transmission structure in FIG. 18 that transmits signals to two users by SDM, but the two transmission structures are different in terms of the antenna beam selection and precoder optimization process.

Referring to FIG. 19, codewords for each user are individually encoded by an error correcting code in an encoding unit 1910. A scrambling unit 1920 scrambles the output bits of the encoding unit 1910 by multiplying them by a scrambling code sequence, and a modulation mapping unit 1930 maps the scrambled bits to modulation symbols according to the predetermined modulation scheme.

A layer mapping unit 1940 maps two modulation symbol sequences for each user to two layers, and a precoding unit 1950 maps two layer signals to four antenna port signals by a predetermined precoder. A beam assignment unit 1960 assigns one beam to each precoded signal from the precoding unit 1950, and a beam multiplexer 1970 multiplexes $4*N_{user}$ signals beam-assigned for $N_{user}$ users, to $N_{beamgroup}$ beam groups depending on the sameness of the antenna beam combination.

A resource mapper 1980 maps the beam-multiplexed signals to predetermined time-frequency resources, and OFDM generation units 1990-1~1990-$J_T$ convert the outputs of the resource mapper 1980 into OFDM symbol signals corresponding to $J_T$ beams, respectively, and output them to an analog processing unit (not shown).

FIG. 20 shows a transmission structure for $(N_{cw}, v, P, N_{sdm}) = (2,4,4,J_T/4)$ according to an exemplary embodiment of the present invention. In the illustrated example, this transmission structure provides SM SU-MIMO for v=4 to one user with each time and frequency resource, where v denotes the number of layers.

Referring to FIG. 20, codewords for each user are individually encoded by an error correcting code in an encoding unit 2010. A scrambling unit 2020 scrambles the output bits of the encoding unit 2010 by multiplying them by a scrambling code sequence, and a modulation mapping unit 2030 maps the scrambled bits to modulation symbols according to the predetermined modulation scheme.

A layer mapping unit 2040 maps two modulation symbol sequences for each user to two layers, and a precoding unit 2050 maps two layer signals to four antenna port signals by a predetermined precoder. A beam assignment unit 2060 assigns one beam to each precoded signal from the precoding unit 2050, and a beam multiplexer 2070 multiplexes $4*N_{user}$ signals beam-assigned for $N_{user}$ users, to $N_{beamgroup}$ beam groups depending on the sameness of the antenna beam combination.

A resource mapper 2080 maps the beam-multiplexed signals to predetermined time-frequency resources, and OFDM generation units 2090-1~2090-$J_T$ convert the outputs of the resource mapper 2080 into OFDM symbol signals corresponding to $J_T$ beams, respectively, and output them to an analog processing unit (not shown).

The above-described exemplary analog beamforming and digital antenna signal processing architecture may be similarly used for transmitting not only the user data but also control information. In order to receive its own control information, a station needs to know information about an initial value of a scrambling code sequence used in the scrambling unit.

As is apparent from the foregoing description, the disclosed exemplary embodiments of the present invention may efficiently support both the multi-antenna technology by digital signal processing and the analog beamforming. Exemplary embodiments of the present invention use a large number of antennas and perform analog beamforming, thereby obtaining a very high antenna gain. In addition, the invention may flexibly cope with a variety of user and channel environments by simultaneously using a variety of digital multi-antenna signal processing and multiple access technologies, contributing to an increase in system performance. With the use of the combined signal processing architecture, exemplary embodiments of the present invention may provide digital beamforming or diversity, support SU-MIMO or MU-MIMO, and provide not only TDM but also FDM and SDM.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting signals in a multi-antenna system, the method comprising:
   precoding a plurality of modulation symbols to generate a plurality of precoded signals for each user equipment among a plurality of user equipments, each of the plurality of precoded signals corresponding to a different virtual antenna;
   assigning the plurality of precoded signals for each user equipment to a plurality of analog beams associated with a plurality of physical antennas, each analog beam having a beam pattern defined by a beam width and a beam direction that is different for each of the plurality of analog beams;
   multiplexing the plurality of precoded signals to a plurality of group signals, wherein a group signal includes precoded signals of one or more user equipments assigned to a same analog beam combination of the plurality of analog beams associated with the plurality of the physical antennas;
   mapping precoded signals included in each group signal assigned to different analog beams associated with the plurality of physical antennas to different resources, first precoded signals assigned to a first analog beam are mapped to a same time resource; and
   transmitting, using one or more of the plurality of analog beams associated with the plurality of physical antennas, the precoded signals on the corresponding resources to which the precoded signals are mapped,
   wherein precoded signals included in a group signal are transmitted on a same time resource, and precoded signals included in different group signals are transmitted on different time resources.

2. The method of claim 1, wherein the transmitting comprises:
   converting the precoded signals to a plurality of radio frequency (RF) signals; and
   transferring each of the RF signals to at least one physical antenna based on a switching pattern determined based on corresponding analog beams.

3. The method of claim 1, further comprising:
   multiplexing the plurality of precoded signals to a plurality of group signals, such that the precoded signals assigned to a same analog beam are multiplexed into a group signal;
   prioritizing the plurality of group signals comprising the plurality of precoded signals by scheduling;
   determining whether interference between an analog beam corresponding to each group signal and a previously selected analog beam is less than a reference value in order of priorities of the plurality of group signals;
   mapping the precoded signals included in a group signal having interference less than the reference value to orthogonal frequency division multiplexing (OFDM) symbols to be transmitted; and repeating the determining and the mapping until at least one of resources of assignable OFDM symbols are assigned and transmission for the plurality of analog beams is considered.

4. The method of claim 1, wherein the plurality of modulation symbols are mapped to a plurality of layers before the precoding.

5. The method of claim 4, wherein the plurality of precoded signals are generated based on at least one precoding matrix.

6. The method of claim 1, wherein the mapping of the precoded signals comprises:
mapping the precoded signals for different user equipments corresponding to a same analog beam, to different frequency resources of the same time resource.

7. The method of claim 1, wherein the mapping of the precoded signals comprises:
mapping the precoded signals for different user equipments corresponding to a same analog beam, to different time resources of a same frequency resource.

8. The method of claim 1, wherein the mapping of the precoded signals comprises:
identifying an analog beam having less interference among the plurality of analog beams; and
mapping at least one precoded signal assigned to the identified analog beam to a same time-frequency resource.

9. The method of claim 1, wherein a first analog beam that carries a first precoded signal for a first user equipment of the plurality of user equipments is determined as an analog beam selected for the first user equipment.

10. The method of claim 1,
wherein the precoded signals assigned to at least one selected analog beam are mapped to a plurality of orthogonal frequency division multiplexing (OFDM) signals and are transmitted at the same time resource, and
wherein the precoded signals assigned to unselected analog beams are transmitted at a different time resource than the precoded signals assigned to the at least one selected analog beam.

11. An apparatus for transmitting signals in a multi-antenna system, the apparatus comprising:
a controller configured to:
precode a plurality of modulation symbols to generate a plurality of precoded signals for each user equipment among a plurality of user equipments, each of the plurality of precoded signals corresponding to a a different virtual antenna,
assign the plurality of precoded signals for each user equipment to a plurality of analog beams associated with a plurality of physical antennas, each analog beam having a beam pattern defined by a beam width and a beam direction that is different for each of the plurality of analog beams,
multiplex the plurality of precoded signals to a plurality of group signals, wherein a group signal includes precoded signals of one or more user equipments assigned to a same analog beam combination of the plurality of analog beams associated with the plurality of the physical antennas; and
map precoded signals included in each group signal assigned to different analog beams associated with the plurality of physical antennas to different resources, wherein first precoded signals assigned to a first analog beam are mapped to a same time resource; and a transceiver configured to transmit, using one or more of the plurality of analog beams associated with the plurality of physical antennas, the precoded signals on the corresponding resources to which the precoded signals are mapped,
wherein precoded signals included in a group signal are transmitted on a same time resource, and precoded signals included in different group signals are transmitted on different time resources.

12. The apparatus of claim 11, wherein the transceiver is further configured to:
convert the precoded signals to a plurality of radio frequency (RF) signals, and
transfer each of the RF signals to at least one physical antenna based on a switching pattern determined based on corresponding analog beams.

13. The apparatus of claim 11, wherein the controller is further configured to:
multiplex the plurality of precoded signals to a plurality of group signals, such that the precoded signals assigned to a same analog beam are multiplexed into a group signal;
prioritize the plurality of group signals comprising the plurality of precoded signals by scheduling,
determine whether interference between an analog beam corresponding to each group signal and a previously selected analog beam is less than a reference value, in order of priorities of the plurality of group signals,
map the precoded signals included in a group signal having interference less than the reference value, to orthogonal frequency division multiplexing (OFDM) symbols to be transmitted, and
repeat the determination and the mapping until at least one of resources of all assignable OFDM symbols are assigned and transmission for the plurality of analog beams is considered.

14. The apparatus of claim 11, wherein the plurality of modulation symbols are mapped to a plurality of layers before precoding.

15. The apparatus of claim 14, wherein the plurality of precoded signals are generated based on at least one precoding matrix.

16. The apparatus of claim 11, wherein the controller is further configured to map the precoded signals for different user equipments corresponding to a same analog beam to different frequency resources of the same time resource.

17. The apparatus of claim 11, wherein the controller is further configured to map the precoded signals corresponding for different user equipments corresponding to a same analog beam to different time resources of a same frequency resource.

18. The apparatus of claim 12, wherein the controller is further configured to:
identify an analog beam having less interference among the plurality of analog beams, and
map at least one precoded signal assigned to the identified analog beam to a same time-frequency resource.

19. The apparatus of claim 11, wherein a first analog beam that carries a first precoded signal for a first user equipment of the plurality of user equipments is determined as an analog beam selected for the first user equipment.

20. The apparatus of claim 11,
wherein the precoded signals assigned to at least one selected analog beam are mapped to a plurality of orthogonal frequency division multiplexing (OFDM) signals and are transmitted at the same time resource, and wherein the precoded signals assigned to unselected analog beams are transmitted at a different time resource than the precoded signals assigned to the at least one selected analog beam.

* * * * *